United States Patent
Medley et al.

(10) Patent No.: US 7,485,851 B2
(45) Date of Patent: Feb. 3, 2009

(54) COMPOUND OPTICAL COUPLER AND SUPPORT MECHANISM

(75) Inventors: Dwight Medley, Fayetteville, TN (US); Larry D. Frederick, Huntsville, AL (US); Dean Estill, Huntsville, AL (US)

(73) Assignee: Titan Specialties, Ltd., Pampa, TX (US)

( * ) Notice: Subject to any disclaimer, the term of this patent is extended or adjusted under 35 U.S.C. 154(b) by 50 days.

(21) Appl. No.: 11/806,215

(22) Filed: May 30, 2007

(65) Prior Publication Data
US 2008/0142720 A1    Jun. 19, 2008

Related U.S. Application Data

(63) Continuation-in-part of application No. 11/347,567, filed on Feb. 6, 2006, now Pat. No. 7,381,957, which is a continuation-in-part of application No. 10/911,485, filed on Aug. 5, 2004, now Pat. No. 7,115,873.

(51) Int. Cl.
*G01V 5/04*    (2006.01)
(52) U.S. Cl. .................................................. 250/256
(58) Field of Classification Search ............... 250/256
See application file for complete search history.

(56) References Cited

U.S. PATENT DOCUMENTS

| | | | |
|---|---|---|---|
| 5,070,249 A | 12/1991 | White | |
| 5,548,116 A * | 8/1996 | Pandelisev | 250/256 |
| 6,222,192 B1 | 4/2001 | Sekela et al. | |
| 6,359,282 B1 | 3/2002 | Sekela | |
| 6,465,788 B1 | 10/2002 | Medley | |
| 2004/0132912 A1 | 7/2004 | McElwee | |

OTHER PUBLICATIONS

International Search Report and Written Opinion (PCT/US08/65037).
Amram et al.; "The ANTARES Optical Module;" The ANTARES Collaboration; pp. 1-26, Feb. 1, 2008.
Folch, Albert et al.; "Microfabricated Elastomeric Stencils for Micropatterning Cell Cultures;" J. Biomedical Material Research Part A, vol. 52, No. 2, pp. 346-353; 2000.

* cited by examiner

*Primary Examiner*—David P Porta
*Assistant Examiner*—Marcus H Taningco
(74) *Attorney, Agent, or Firm*—Dickstein Shapiro LLP

(57) ABSTRACT

A support mechanism for protecting an object is described. The support system includes at least one support or friction ring for providing dynamic protection to the object. One embodiment includes a support ring having corrugated bumps. Another embodiment includes multiple support rings axially separated by spacers. In another embodiment a support mechanism is provided having at least one friction ring in combination with O-rings. A compound optical coupler is also described, which has a self-wetting clear optical coupling gel and an elastomeric load ring. In another aspect, a compound optical coupler assembly comprises a self-wetting optical coupling gel and also an amount of a stiffening agent.

9 Claims, 16 Drawing Sheets

COMPOUND OPTICAL COUPLER AND SUPPORT MECHANISM

This application is a continuation-in-part application of U.S. application Ser. No. 11/347,567, filed on Feb. 6, 2006 now U.S. Pat. No. 7,381,957, which is a continuation-in-part application of U.S. patent application Ser. No. 10/911,485, filed on Aug. 5, 2004, now U.S. Pat. No. 7,115,873, issued on Oct. 3, 2006, the entire disclosures of which are incorporated herein be reference.

BACKGROUND

The invention generally relates to a protective mechanism and an optical coupler for use in systems for detecting the presence of hydrocarbons during mining or drilling operations. In the prior art, special optical couplers using Sylgard along with optical coupling oil have been employed with prior support systems to couple light from a scintillation element into a light detector device. Such an optical coupler is disclosed in U.S. Pat. No. 6,465,788, which is incorporated herein by reference in its entirety. One drawback to this approach is that, under some extreme cases of high loads, uneven loads, or high vibration, oil used in the optical coupling may migrate out over time and result in degraded detector performance. Another drawback is that precision fabrication and/or assembly tolerances must be maintained to prevent loss of oil and degraded performance. Yet another drawback is that particulate contamination of the optical coupler can also cause loss of oil and degraded performance. Another example of an optical interface is disclosed in U.S. Pat. No. 6,222,192 to Sekela et al., the entire disclosure of which is incorporated herein be reference.

Optical couplers made from self-wetting type materials (e.g., Wacker) have also been used. A drawback to these concepts is that the self-wetting materials exhibit viscous behavior and tend to flow outward from the optical interface, allowing the optical interface retaining force to be lost, and thus resulting in degraded performance. Wacker is an example of a self-wetting, optically clear material that is used for optical coupling, and is sometimes the material of choice. The only materials otherwise suitable for use inside a hermetic housing that contains a sodium iodide crystal, which also is capable of withstanding substantial dynamic loading and stresses, are not optically clear, and or do not provide a consistent high quality optical interface. However, Wacker and other similar materials, cannot withstand substantial loading and/or will produce false scintillations under vibration due to movements. Previous efforts to use this material include attempting to limit longitudinal loading on the material but result in the crystal assembly moving longitudinally during high longitudinal vibration and/or result in failure to move to maintain optical coupling under large changes in temperature.

Nuclear detectors, such as gamma detectors, have been used in mining applications and oil drilling operations for many years. In particular, gamma detectors have been used to measure the radiation that emanates from the formations surrounding the mining or drilling equipment. Such gamma detectors operate by utilizing the differences between the natural radioactivity of the target formation and the natural radioactivity of the adjacent formations to determine the boundaries between these formations. In the case of mining potash, the most desirable material to be mined from the formation is the most radioactive, typically being surrounded by salt or lower grade mineral.

Gamma detectors are sensitive and must be protected from harsh environments to survive and to produce accurate, noise free signals. This protection must include protection from physical shock and stress, including force, vibration, and abrasion, encountered during solid mineral mining and oil drilling operations. However, the closer in proximity the gamma detector is to the mineral being mined or drilled, the greater is the shock, vibration and stress to which the detector is subjected.

The presence of armor, which is required to protect the detector, further limits the available space. An explosion-proof housing takes up even more of the available space, and often results in reducing the diameter of the photomultiplier tube. When light detecting devices of relatively low mass density are used in connection with scintillation elements having a relatively high mass density, a special means of support is needed to reduce rotation moments when under high vibration or high shock. Lower cost for providing protection for the detector is also needed.

Advances have been made in recent years that improve the survivability and performance of gamma detectors that are used in mining, drilling, and other harsh environments. Yet, there remains a need for further improvements. One area of need arises whenever large scintillation crystals are used in a harsh environment such as mining. Long term wear and damage to the support system from continual high shocks can occur due to the larger mass of the scintillation element. Shock isolation must be done with sufficient care to not damage the interface between the crystal and the light collecting element. Another area of need is for a support system that can be designed with less engineering and analytical expertise, so that components can be fabricated with more ease and at a lesser cost.

A support system must be very effective in protecting the detector from the harsh vibrations and shock, but must also do so while consuming a small amount of space. Similarly, in mining operations, the outer portions of the detector and the armor must provide a high level of shielding from unwanted radiation and must protect the detector from impact and abrasion, all with a minimal use of space.

Radial springs, although effective in other applications, have not been utilized in subject applications, because, for example, radial springs have been found to be difficult to install, particularly for large scintillation elements and especially for large detectors. Also, the selection of the width, thickness, and design of radial springs in the applicable spaces of gamma detectors has been found to be complex, thus discouraging their use in some instances.

In the prior art, detectors have been protected by a plurality of springs which extended along the axial length of the detector or its scintillation element. An example of such a support system is a flexible dynamic housing, as disclosed in U.S. Pat. Nos. 6,452,163 and 6,781,130, which are incorporated by reference herein in their entireties. One drawback of such systems is that the springs extend along the axial length of the scintillation element and as such can block radiation from reaching the scintillation element, which is particularly important where rapid motion of the cutter necessitates obtaining the maximum possible gamma count rate. Moreover, the springs of the flexible housing have to be custom made for this specific industrial application. Also the annular gap that exists between the scintillation element and its rigid housing is not always uniform, such as because of dimensions of tolerance. This may complicate the installation or sizing of the system.

Flexible dynamic housings and flexible sleeves helped to solve some problems. One very important characteristic of these supports is the reliance upon friction to hold the scintillation element, photomultiplier tube, and other elements in position during high vibration, while allowing for thermal expansion and shock. This reliance upon friction, instead of elastomeric materials reduces resonances, providing a dynamic transmissibility of near unity through most frequencies of concern and then provides effective dynamic damping once the friction is overcome. However, complexities in their design and fabrication resulted in higher cost than desired, requiring special engineering processes, and specialized fabrication procedures. Experience has shown that there is a need to improve upon the advantages of using metallic supports and the use of friction to improve the ability to withstand high vibration and high shock as when used on rotary cutters. Improvement is needed to reduce design and fabrication complexity, and thereby reduce cost.

Another support mechanism for a detector is disclosed in pending application Ser. No. 10/270,148, which is incorporated herein by reference in its entirety. This type of support mechanism is a flexible support sleeve which extends along the length of the detector or scintillation element, and suffers from the same drawbacks discussed above with respect to the springs. Furthermore, very high shock conditions, particularly for larger crystals, can over stress flexible sleeves at the bends of such sleeves, causing the contact pressure to be reduce and thereby having insufficient friction remaining for good support.

There remains a need for an optical coupling system that is less sensitive to fabrication/assembly tolerances, high/uneven loads, and high vibrations. There is also a need for a simplified, lower cost structure and method for supporting instrumentation packages and sensors, such as gamma detectors. A means for supporting sensitive elements, which have substantially a cylindrical shape, is needed to work in cooperation with other suitably chosen support elements. A more suitable method of supporting sensitive elements so as to produce less compression of optical reflecting material is also needed.

Through the years, even at the present time, use has been and is being made of elastomeric or rubber materials in an effort to protect scintillation elements, photomultipliers, electronics, and assemblies of these items while being used in harsh environments. Although elastomers have proven to useful for cushioning high shock, high vibration combined with high shock has proven to be very challenging for protecting fragile elements such as sodium iodide crystals or cesium iodide. If wide temperature excursions are also involved, the problem is even more challenging. There are fundamental reasons why this is the case. For one thing, these materials, which are much softer than metals, tend to produce a low resonant frequency. This contributes to higher forces being placed upon the objects being protected. Resonating at lower frequencies results in greater displacements of the elements and increases the probability of spontaneous noise generation and/or damage.

In an effort to reduce these effects, one may compress the materials around the object being protected so that there is less room for it to move. If subjected to large temperature changes as is experienced during drilling into the earth or on hot machinery during cutting, the scintillation element expands toward the metallic shield, thus placing excessively high pressure on the element. This is made worse by the expansion of the elastomeric or silicone rubber material, which usually has a very large coefficient of expansion as compared to other parts of the support system. Not only can these high forces damage the elements being supported but they can cause interfacing element such as a scintillation element to be pulled away from the photomultiplier. Trying to overcome such a separation by placing more force onto the interface by using larger springs to force the two together has sometimes been shown to break the face of the photomultiplier tube, or the coupling, or the scintillation element. Yet, attempts to overcome this problem by mechanically limiting the forces placed on the interface tends to recreate the problem trying to be solved. Reduction of the restraining forces allows the interfacing elements to resonate in their longitudinal direction.

Added to the above is the fact that the internal damping characteristics of elastomeric materials or silicone rubber are poor compared to that of sliding friction. The result is that when resonance is made possible by the geometric considerations described above, the magnitude of the resonance is greater than it would be if sliding friction were more prevalent. Thus, the limits of applicability for such materials do not satisfy the needs of the industry.

SUMMARY

The inventions provide a gamma detector which, in some aspects, may be utilized in solid mineral mining, such as coal, potash and trona, oil well drilling and/or servicing operations, de-gassing of coal formations, and logging of solid mineral formations. In one aspect of the inventions, the gamma detector includes a scintillation element.

The fundamental limiting factors related to the use elastomers and other relatively soft materials, when both high vibration and high shock are encountered, have been substantially overcome with earlier inventions that employ metallic supports. This use of metallic supports has been successful to a considerable degree through the reliance upon friction to restrain elements being protected from high vibration and high shock, and even with changes in temperature. This current invention substantially overcomes weaknesses remaining with the earlier metallic supports by use of friction rings, and also incorporates the combined improvements of a compound coupler arrangement and friction rings.

The current invention provides for the use of metallic support rings that utilize friction to support instruments in near-rigid dynamic state through most of the vibration conditions, which helps to maintain a high resonant frequency. When the friction restraint forces are overcome by high shock, so that the object being supported, such as a scintillation element or photomultiplier tube or other instrumentation element, begins to move, the resulting sliding friction provides a high degree of damping. For extremely harsh conditions, O-Rings are added to serve as shock absorbers and to limit the movement of the elements being supported.

Friction rings used in combination with O-rings and a compound optical coupler, all within a hermetically sealed shield provides for an extremely robust configuration that also provides for improved operating performance.

Numerous mechanical details are provided in the artwork and specifications for earlier patents, which in many cases may be applicable to the current invention for certain specific application requirements. Someone reasonably skilled in the art can be expected to make appropriate use of those details, using the current invention.

In one aspect, the invention provides a scintillation element package comprising a scintillation element; a housing encompassing the scintillation element; and a support mechanism including at least one support ring, the support mechanism being between the scintillation element and the housing.

In another aspect, the invention provides a gamma detector comprising: a photomultiplier tube; a first housing surrounding the photomultiplier tube; and a support mechanism including at least one support ring supporting the photomultiplier tube.

In yet another aspect, the invention provides a support mechanism comprising: a rigid housing and a support mechanism having a support ring, wherein the support mechanism at least partially surrounds an object to be protected, and wherein the support mechanism is between the rigid housing and the object.

In still another aspect, the invention provides a detector comprising: a scintillation element; a first housing and a second housing; an inner support mechanism including at least one support ring, said inner support mechanism supporting the scintillation element; an outer support mechanism including at least one support ring, said outer support mechanism supporting the scintillation element and surrounding said inner support system.

In another aspect, the invention provides a compound optical coupling assembly comprising a self-wetting optical coupling gel in an interior portion of the optical coupling assembly, and an elastomeric load ring radially outward of the self wetting optical coupling gel. In order to permit use of a soft optical coupling material, such as Wacker, which is optically clear or having other superior properties, a relatively transparent load bearing material, such as Sylgard, surrounding the non-load bearing coupling material. Another way to make the optical coupling is to bond the crystal to the photomultiplier tube.

This invention provides a low cost method of supporting instrumentation systems and/or subsystems within mining equipment, or other equipment used in harsh environments. The invention provides a scintillation element package that includes a scintillation element, a shield encompassing the scintillation element, and a support mechanism having a support ring at least partially surrounding the scintillation element within the shield, the support mechanism providing support for the scintillation element.

The invention also provides, in one aspect, a support mechanism that includes a support ring surrounding and protecting an object to be protected, wherein the support mechanism provides support for the object. In another aspect, the invention provides a support mechanism having a support ring including an inner support mechanism surrounding and protecting an object to be protected and an outer support mechanism surrounding the inner support mechanism, the outer support mechanism fitting within a cavity.

In another aspect, the invention provides a detector having a scintillation element, a housing encompassing the scintillation element, and a support mechanism including at least one friction ring, wherein the support mechanism is between the scintillation element and the housing. In yet another aspect, the invention provides a gamma detector support mechanism, having a rigid housing and a support mechanism having at least one friction ring and at least one shock ring, wherein the support mechanism is at least partially surrounding an object to be protected, wherein the support mechanism is between the rigid housing and the object.

In another aspect, a compound optical coupler assembly is disclosed having a compound optical pad that has desirable characteristics of a light transmitting self-wetting optical coupling gel, and is also more stable during the installation process. The compound optical pad of the coupler assembly has a self-wetting optical coupling gel and also an amount of a stiffening agent.

DETAILED DESCRIPTION OF PREFERRED EMBODIMENTS

Figure 1:
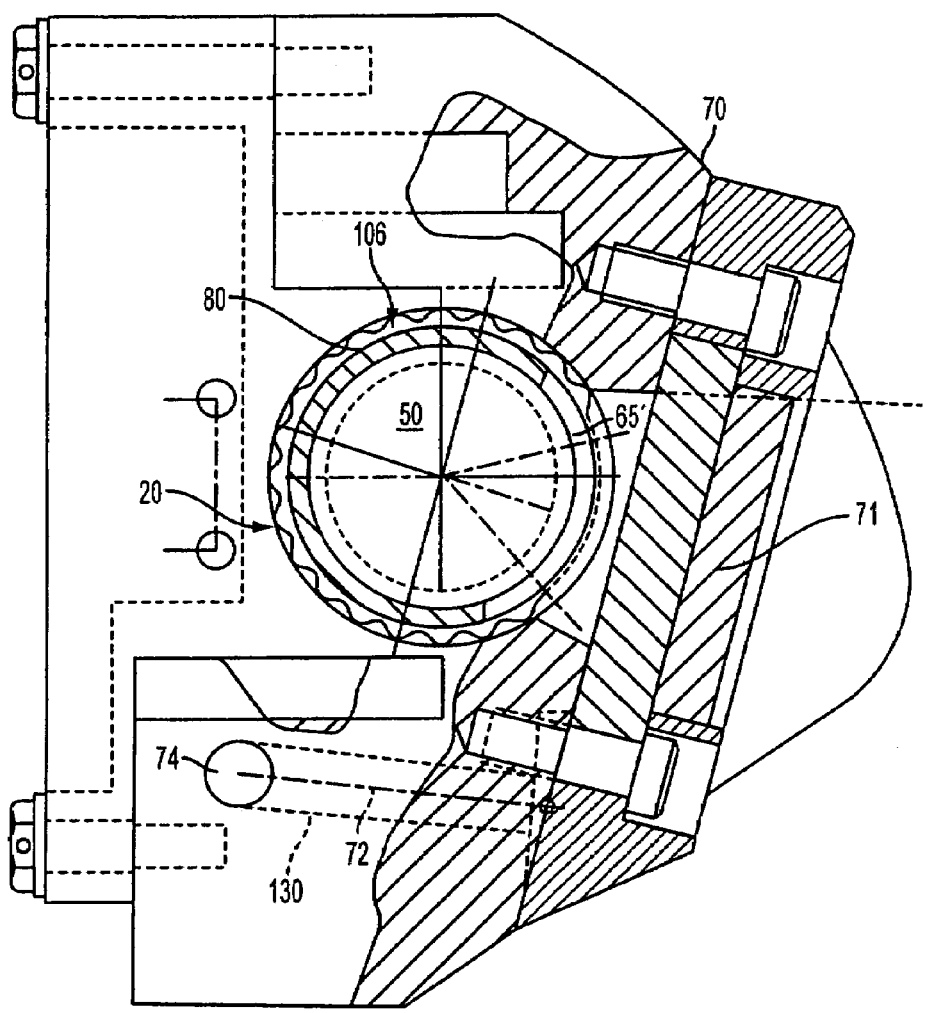
FIG. 1 is a cross-sectional view of an armored housing for solid mineral mining use having a gamma detector support mechanism constructed in accordance with an embodiment of the invention.
Figure 2:
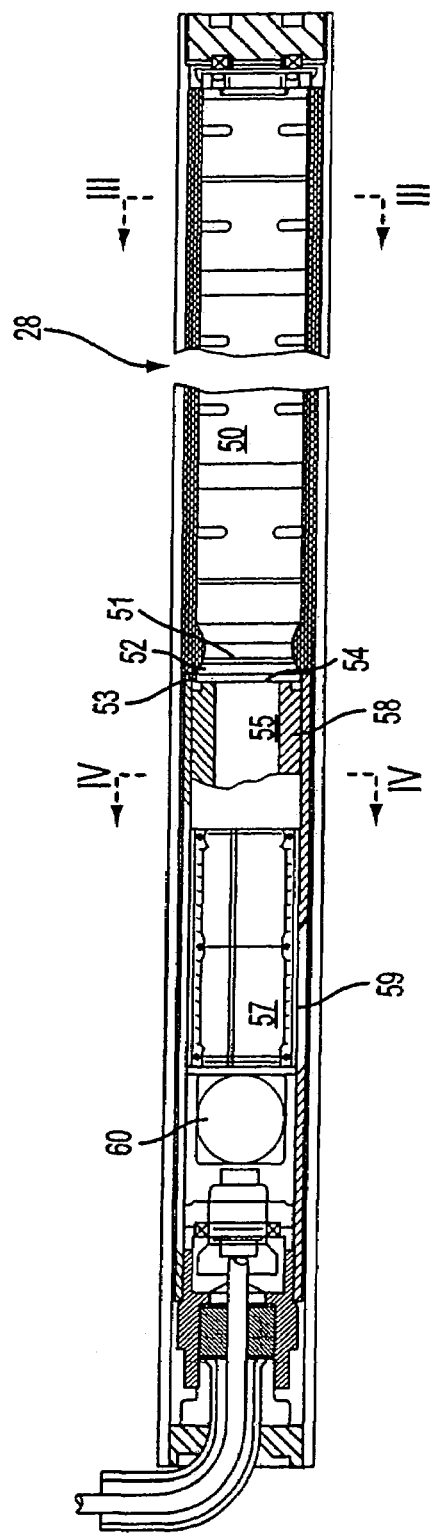
FIG. 2 is a cross-sectional view along the length of the gamma detector of FIG. 1.
Figure 3:
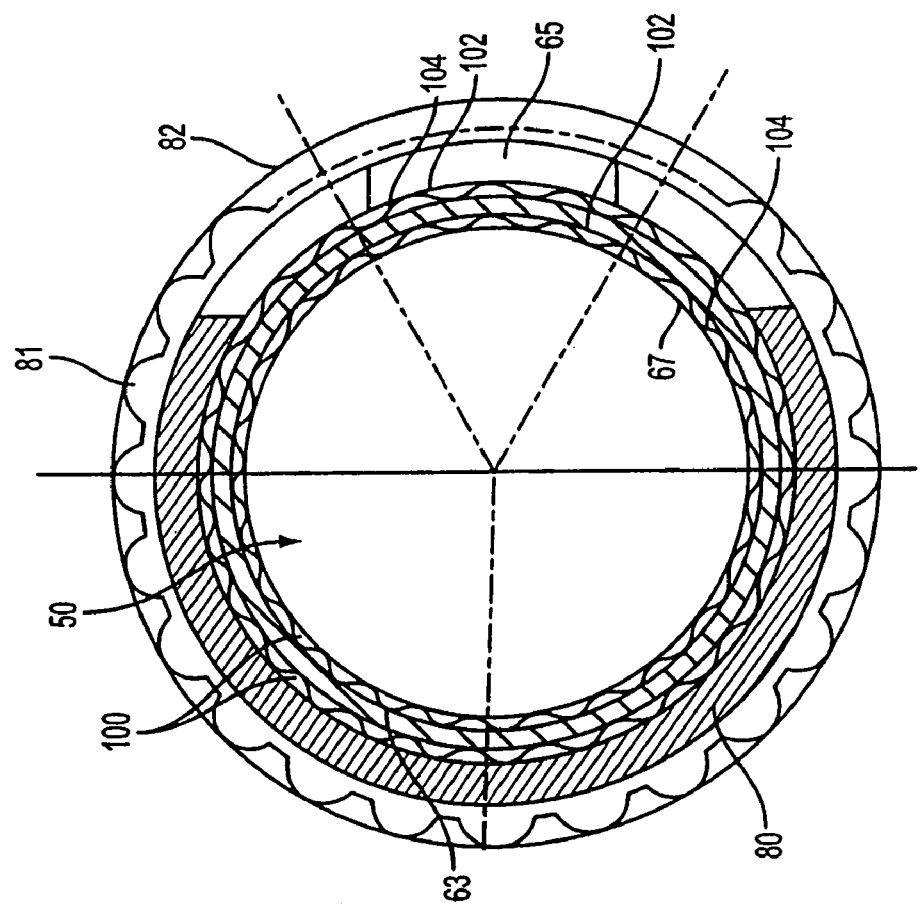
FIG. 3 is a cross-sectional view taken along line III-III of FIG. 2.
Figure 4:
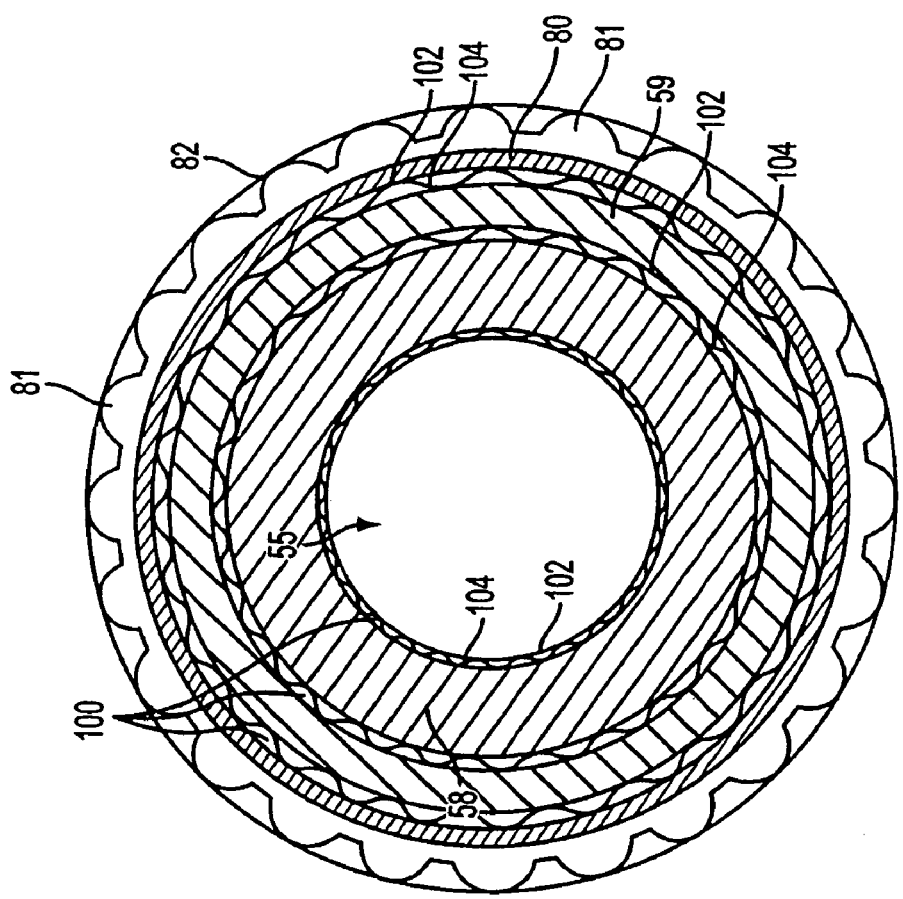
FIG. 4 is a cross-sectional view taken along line IV-IV of FIG. 2.

FIG. 1 illustrates a gamma detector 20 installed into armor 70 for mounting a mining module for use in solid mineral mining operations. As shown in FIG. 1, the detector 20 is protected by armor 70 that surrounds, shields, and supports the detector. The detector 20 also may be used in conjunction with oilfield operations, without the armor 70. FIG. 2 shows a cross-sectional view of the gamma detector 20. FIGS. 3 and 4, which are cross-sectional views of FIG. 2, show the various components that protect the scintillation element 50, the electronics 57 and other sensors. These multiple levels of protection are described in detail below.

With reference to FIGS. 1 and 2, gamma rays 28 entering the gamma detector 20 pass through a non-metallic window 71 to reach the scintillation element 50 within the detector 20. Other windows 65 (FIG. 3) have been cut into a rigid dynamic enclosure 80 which surrounds the scintillation element 50.

Next, with reference to FIG. 2, the general function of the detector 20 will be described. A scintillation element 50 responds to gamma rays 28 that have been emitted from rocks in the soil. The response of element 50 is to produce a tiny pulse of light that travels to a window 52 at the window end of the scintillation element 50 or is reflected into the window 52 by a reflector 67 (FIG. 3) that is wrapped around the scintillation element 50. The light pulse travels through a first optical coupler assembly 51, through the window 52, and through a second optical coupler assembly 53 into the faceplate of a light detecting element, shown here as a photo-multiplier tube 55. An electrical pulse is generated by the photo-multiplier tube 55 and sent to electronics element 57.

The photo-multiplier tube 55, the electronics element 57 and an accelerometer 60 are located in an assembly called a photo-metric module 58. Since components within the photo-metric module 58 utilize electricity, it is necessary that it be enclosed in an explosion-proof housing 59 to avoid accidental ignition of gas or dust that may be in the vicinity of the detector 20. Also, the explosion-proof housing 59 serves as an effective barrier that protects the electrical elements 57 and the accelerometer 60 from the strong electromagnetic fields generated by heavy electrical equipment.

Better details of the protective elements are shown in FIGS. 3 and 4. The first view in FIG. 3 shows a support mechanism 100 that surrounds the scintillation element 50, and protects it from high levels of lower frequency vibrations. The support mechanism 100 will be described in greater detail below. The support mechanism 100 between the scintillation element 50 and the scintillation shield 63 supports the fragile scintillation element 50 and provides a high resonant frequency so that it will not resonate with lower frequency vibrations that pass through the outer housing. The outer housing 82 encloses another support mechanism 100, the rigid enclosure 80 and a rigid elastomeric shock absorbing sheath 81 which surrounds the enclosure 80.

A typical size scintillation element 50 for this application is 1.4 inches in diameter by 10 inches in length, but may be as large as 2 inches in diameter. The resonant frequency of these outer support elements 81, 80 protect against shock and isolate the scintillation element 50 from high frequencies.

FIG. 4 illustrates a view of a photo-metric module including a photo-multiplier tube 55 inside a first housing 58, which is within the explosion-proof housing 59. The support mechanism 100 is located at three radial elevations about the photo-multiplier tube 55: between the photomultiplier tube 55 and the first housing 58; between the first housing 58 and the explosion-proof housing 59; and between the explosion-proof housing 59 and the rigid enclosure 80.

The elastomeric shock-absorbing sheath 81 fully covers the entire rigid dynamic enclosure 80. It should be noted that this sheath 81 serves other useful purposes. It provides good mechanical compliance with the armor 70. This is particularly important during installation in which dust and particles will be present. Another purpose of the sheath 81 is to prevent water or dust from entering through the window in the enclosure 80. The accelerometer module 60 is afforded the same critical protection from the harsh environment as the photo-multiplier tube 55.

In use, there is a need to firmly hold the light collecting element, which in this case is the photo-multiplier tube 55, so that it remains fixed in position relative to the window 52 through which the light is passing from the gamma detector scintillation element 50. This is especially important in the disclosed embodiment because the exemplary optical coupling between the photo-multiplier tube 55 and the window 52 is a two-piece compound coupling. One piece of the coupling is a soft, self-wetting pad typically made from a material called Wacker. Surrounding this inner coupling is a ring made from a more substantial material such as Sylgard, also pliable, optically transparent material. The self-wetting optical coupler of the invention will be discussed in greater detail below.

To work properly, the photo-multiplier tube 55 must not be free to move more than a few thousands of an inch in the radial direction, while at the same time, be pushed with a uniform force against the coupling elements and by a spring. To accomplish these dual requirements, the photo-multiplier tube 55 must be sufficiently free to move in the longitudinal direction while having its motion in the radial direction significantly restrained. Moreover, thermal expansion must not interfere with the two requirements discussed above.

Figure 5:
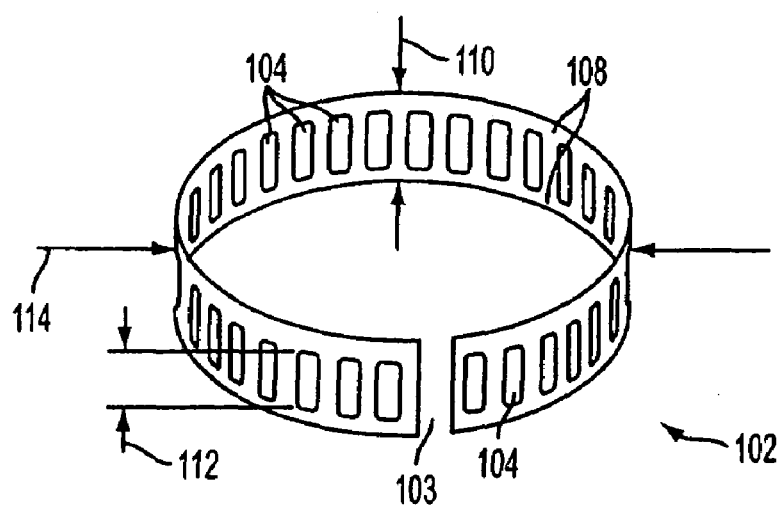
FIG. 5 is a perspective view of a support ring of the support mechanism of FIG. 1.

These requirements are accomplished by the support mechanism 100 of the present invention. The support mechanism 100 comprises support rings which are placed around the photo-multiplier tube 55. The support mechanism 100 will be described with reference to FIGS. 5 and 6. A main component of the support structure 100 is a support ring 102, an example of which is shown in FIG. 5. Such a support ring 102 is commonly referred to as a tolerance ring in several industrial applications. One manufacturer of such rings is USA Tolerance Rings in Pennington, N.J.

The tolerance, or support ring is a device that facilitates fitting of concentric cylindrical parts. The support ring 102 has corrugated bumps 104 which have a height 112. The support ring 102 also has a height 110 and a diameter 114, and may have a rim 108. In the example shown, the corrugated bumps extend, or face, toward the center of the support ring 102. The inward facing corrugated bumps 104 compress in proportion to torque or radial load for wider dimensional tolerance. The support ring 102 is not continuous, and has an opening 103. In use, the opening 103 allows the support ring 102 to flex to accommodate different diameters, to move and to absorb shock and to thermally expand. In a preferred embodiment, a support ring with a part number of ANL-R8-9-S from USA Tolerance Rings can be used. Such a support ring has a diameter 114 of approximately 1.125 inches, a height 110 of approximately 0.313 inches, and a bump height 112 of approximately 0.25 inches. However, the heights 110, 112 of the support ring 102 and bumps 104, and other parameters, may be varied to accommodate design parameters.

The support ring 102 is a frictional fastener, capable of handling direct torque transfer, torque slip, axial retention, controlled collapse and radial loading between mating cylindrical components. It is a corrugated metal strip that acts as an interface between two mechanical objects, to secure one to the other by interference fit. The corrugated bumps 104 deflect and allow the support ring 102 to act like an elastic shim.

Figure 6:
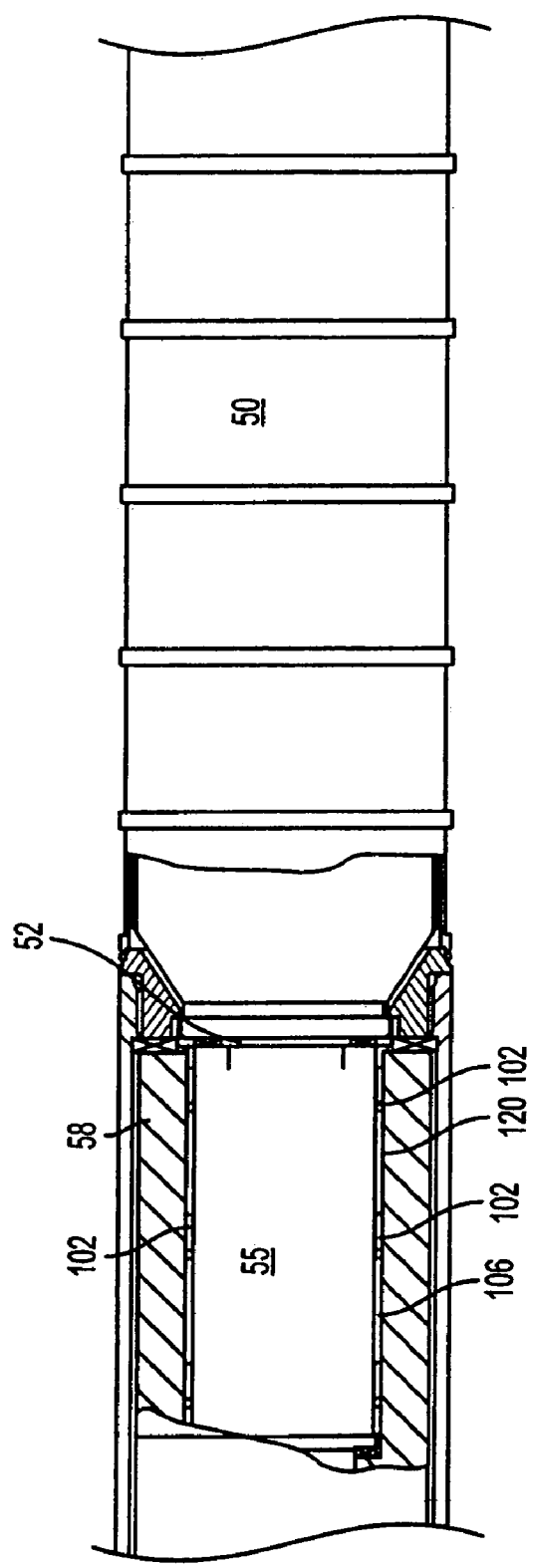
FIG. 6 is a cross-sectional view of a gamma detector having a support mechanism in accordance with an embodiment of the invention.

The number of the support rings 102 is chosen depending on the configuration of the photo-multiplier tube 55. In an exemplary embodiment, between two and five support rings are used. With reference to FIG. 6, three support rings 102 are shown supporting the photo-multiplier tube 55. The support rings 102 may be held in place by metal tape or a metal retainer, designated by numeral 106. The metal tape 106 has an adhesive material on its inward facing surface. The metal tape, or retainer 106, is installed about the housing 120 of the photo-multiplier tube 55. The metal tape or retainer 106 also functions as a spacer to laterally separate the support rings 102. The support rings 102 do not extend longitudinally along the photo-multiplier tube 55. Rather, the support rings 102 extend around the circumference of the photo-multiplier tube 55, and are spaced out in intervals along its length.

Figure 7:
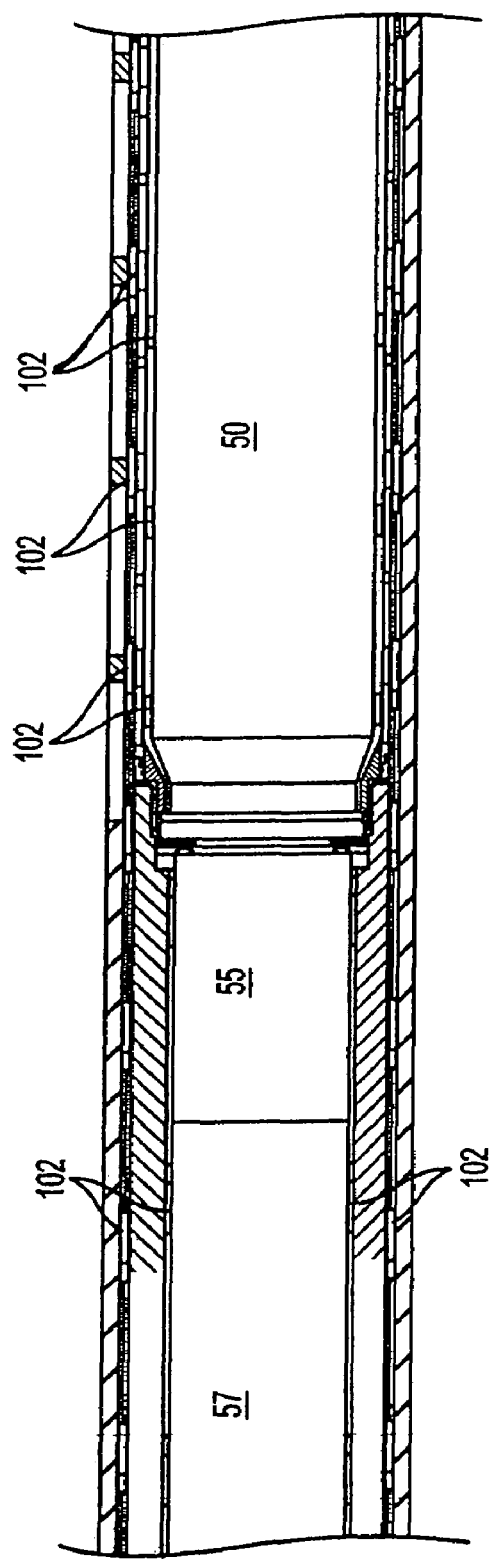
FIG. 7 is a cross-sectional view of a gamma detector having a support mechanism in accordance with an embodiment of the invention.
Figure 8:
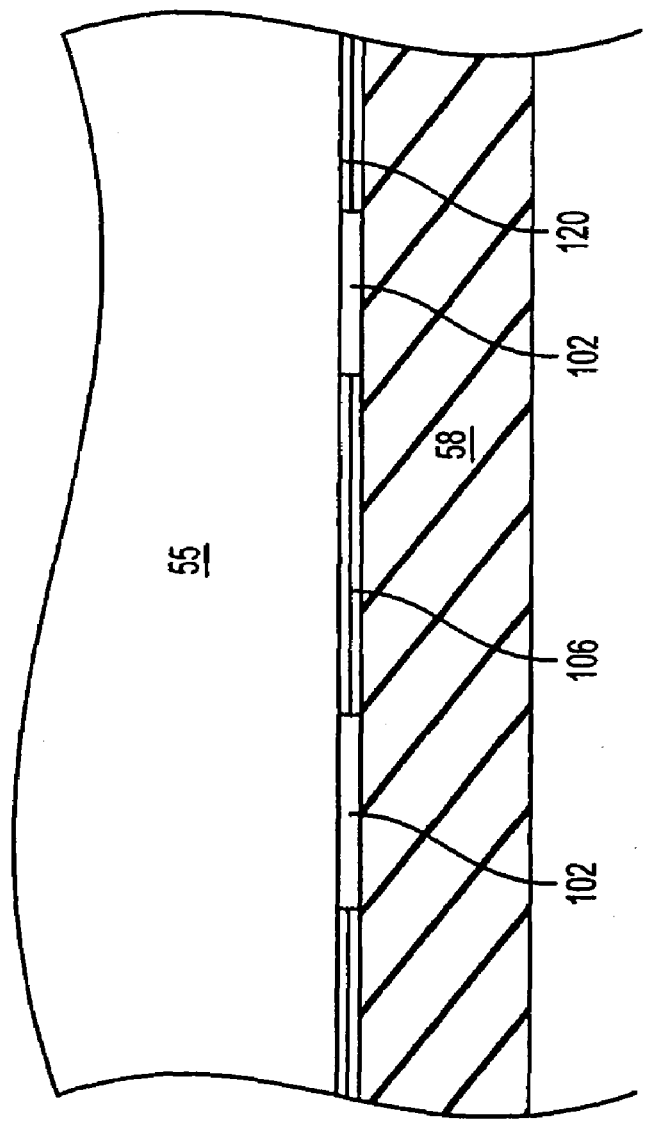
FIG. 8 is a close-up view of FIGS. 6 and 7.

FIG. 7 shows the scintillation element 50, photo-multiplier tube 55 and electrical elements 57 supported by the support mechanism 100. In FIG. 7, the support rings 102 are shown at different radial elevations with respect to the supported components 50, 55, 57. The support rings 102 at different radial elevations do not have to be concentric and can be spaced apart along the length of the protected elements 50, 55, 57. FIG. 8 shows a close-up view of the support mechanism 100. The support rings 102 are separated by the metal tape or retainer 106. The support rings 102 do not extend axially along the length of the photo-multiplier tube 55. Rather, the support rings 102 are spaced apart axially, and extend around the circumference of the photo-multiplier tube 55.

If the first housing 58, the tolerance rings 102 and the photo-multiplier tube housing 120 are of the same material, or material with equivalent thermal expansion coefficient, there will be very little differential expansion due to thermal changes. In applications where the vibration and shock are the most serious environmental challenges and thermal changes are not significant, the choice of materials may not be very significant. In applications such as down-hole drilling for oil and gas, careful attention must be paid to the selection of compatible materials to avoid significant thermal expansion.

It should be noted that in a preferred embodiment, the housing around the photo-multiplier tube 55 is rigidly connected to a crystal outer housing so that the crystal outer housing and the photo-multiplier tube 55 do not move relative to each other. Therefore, if the support rings 102 do not allow excessive motion in the radial direction of the photo-multiplier tube housing 120 relative to the first housing 58, then the photo-multiplier tube 55 would be held sufficiently well relative to the window 52 of the housing and crystal package combination.

If the support rings 102 are made from soft materials, such as elastomers, then they would tend to have a low resonant frequency and a relatively high dynamic transmissibility. This is known to have undesirable consequences. If the rings are made from a rigid material such as solid steel, then the tolerances of all the mating parts would have to be made extremely precise to prevent the elements from being loose, and they would have to be installed in a tight tolerance condition. Yet, if the support rings 102 are tight and rigid, then any errors in tolerances would render the support rings 102 difficult or impossible to install without damaging the delicate instruments. Some instruments for harsh environments are known to be designed in just this manner, and are known to be costly to manufacture. The solution is to use support rings 102 that are made from a strong material, such as stainless steel, but configured such that the support rings 102 have some elastic properties.

In order to conserve valuable space within the detector or other similar tool, the support rings 102 need to be very thin. In use, unique design parameters for the support rings 102 are selected to meet particular requirements of the application for which the support rings 102 are used. Some of the particular requirements are as follows.

The overall thickness of the support rings 102 is selected to fill gaps and tolerances between two components, and selection of appropriate tolerance rings is made using vendor catalog data. Friction forces exerted by the support rings 102 must be sufficient to prevent relative longitudinal motion between two components due to vibration forces, while the size of the support rings 102 must remain small enough to allow ease of assembly. Examples of nominal friction forces are 40 pounds-force for a 1 inch×4 inch detector, and 125 pounds-force for a 2 inch×10 inch detector. Support ring 102 data, provided by vendors, includes: Torque; Capacity; Diametral Clearance; material thickness; and corrugation pitch. These and other parameters are used to determine the appropriate support ring characteristics.

Another consideration when selecting a support ring 102 is protection in a high vibration environment. This is achieved by a natural vibration frequency of the combination of the component and support ring. The natural vibration frequency should not adversely couple with the vibration loads of the environment. Vibration environments that must be protected against are typically in the 100-200 Hz range. Thus, support rings 102 would typically be designed to provide a natural vibration frequency greater than 300 Hz. Stiffness of the support ring is the key parameter used to control the natural vibration frequency. Support ring vendor catalogs typically provide data used to determine support ring stiffness.

Still another consideration is to provide adequate structural support to components in order to prevent structural failure due to damaging acceleration loads. Multiple support rings 102 may be used along the length to provide support as needed to reduce mechanical stress. Traditional stress analysis techniques are used to determine where and how many support rings are needed.

Use of the support rings 102 in the present invention results in a desirable support mechanism 100. The support rings 102 can be selected and installed to provide resistance to movement in the longitudinal direction within acceptable limits while limiting the movement in the axial direction to a few thousands of an inch. Thus, the support system 100 comprising the support rings 102 protects optical coupling elements from excessive stress.

The present inventions offer several advantages, as follows. The inventions provide a lower cost method of supporting instrumentation packages and sensors using off-the-shelf commercial parts. The inventions provide a more convenient method of delivering stiff support to an undersized component fitted into a standard sized housing (i.e., filling of the gap and tolerance). Also, when two parts of a detector assembly (e.g., electronics and crystal elements) that have different diameters are assembled into a common housing, use of tolerance rings allows the parts to be assembled without using sleeves to increase the smaller diameter. Another desirable result is that a lesser amount of radiation is blocked from entering into the scintillation element.

Unlike flexible sleeves and flexible dynamic housings that must extend along the length of the scintillation element, the support mechanism 100 having support rings 102 supports only at two or more locations of the scintillation element. This is possible because of the relative high stiffness of the support ring 102 due to the curved shape of the bumps 104. If the support ring 102 has a rim 108, i.e., the bump 104 does not extend the full height 110 of the support ring 102, the ring will be even stiffer. This improves optical performance of the scintillation element. Since tolerance rings support only at locations of the scintillation element, this leaves a significant portion of the reflective tape along the length of the scintillation element not compressed, and uncompressed reflective tape has superior optical performance.

In addition, the support mechanism having support rings 102 works well where the annular gap between the photo-multiplier tube and its rigid housing is not uniform. Because the support rings do not extend along the axial length of the photo-multiplier tube, variances in the gap dimension in one location will not affect the dynamics of the system in another location. Each support ring 102 acts independently of other support rings 102.

It should be recognized that there are alternative methods of applying the compound coupler and support rings to a scintillation element. For example, one method is to use wraps of teflon and steel between the scintillation reflector 67 and the support rings 102. The scintillation element 50 is wrapped with teflon tape to about 0.03 inches, uncompressed, or with approximately 0.015 inches thick sheet of skived teflon to serve as a reflector. A thin layer of stainless steel, ideally 0.002 inches to 0.005 inches thick, is then wrapped around the teflon reflector, with the joint of the stainless steel wrap positioned on the opposite side of the scintillation element 50 from the joint of the skived teflon sheet. The inside surface of the steel wrap can be coated white, or with a reflective material to provide additional reflection of any light that may pass through the teflon reflector. Support rings 102 are then placed around this assembly with tape or bonded material to hold the rings in place, similar to the way elements 106 in FIG. 8 are used in the embodiment described earlier.

Another method is to wrap the reflector 67, which is around the scintillation element 50, with two layers of stainless steel, the inside surface of the inside layer of stainless steel being coated with a reflecting material. The two layers of stainless steel would be separated by an elastomeric material that is molded or bonded, in the form of ridges or strips, to the surface of one of the layers (similar to the ridges of sheath 81 in FIG. 3). This approach is low cost and reduces the compression forces due to the expansion of the scintillation element 50 during temperature changes so that the support rings 102 may be a stiffer configuration to make installation simpler.

Figure 9:
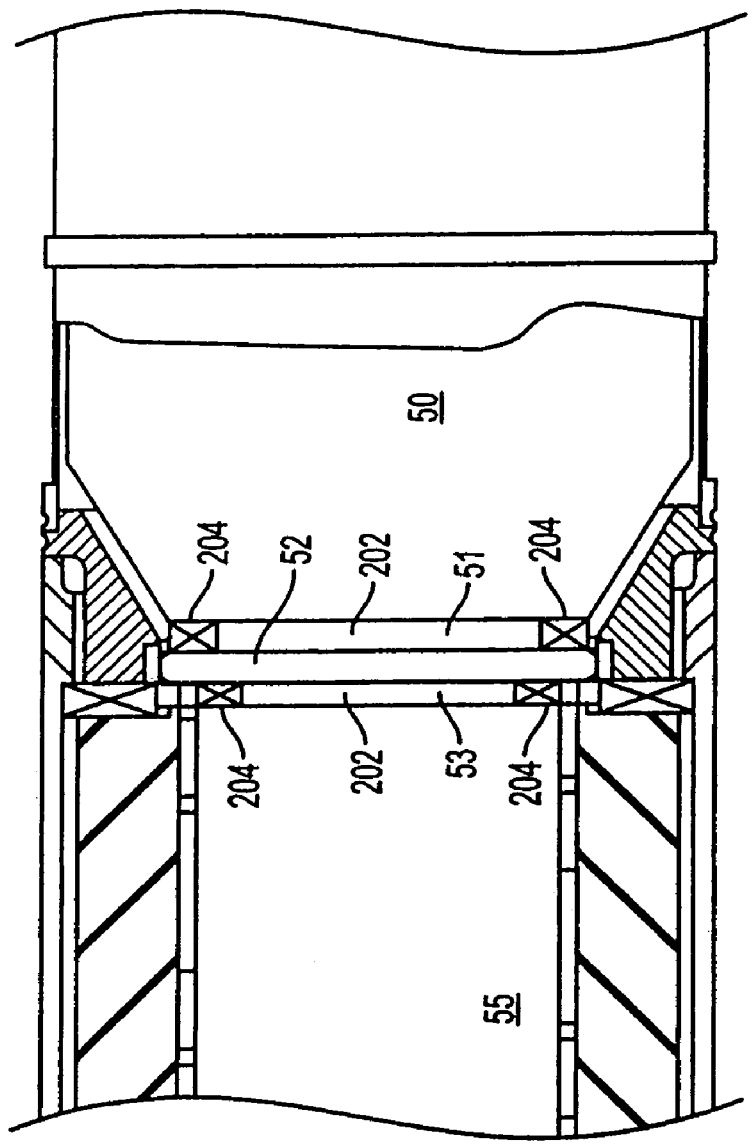
FIG. 9 is a cross-sectional view of an optical coupler constructed in accordance with an embodiment of the invention.

The compound optical coupler of the invention will now described with reference to FIG. 9, which shows in greater detail the first optical coupler assembly 51, the window 52 and the optical coupler assembly 53 of FIG. 2. The invention provides a compound optical coupler that transmits light pulses from a scintillation element 50 into the light detector device (e.g., photomultiplier tube 55). To accomplish this, the invention includes a self-wetting clear optical coupling gel 202, which can be Wacker, for example, and a special elastomeric load ring 204, which can be Sylgard, for example. Alternatively, the load ring 204 can comprise another rubber-type material.

The elastomeric load ring 204 is molded or otherwise attached to the face of the photomultiplier tube 55 and the window unit 52 to form an annular ring with an outer diameter that is preferably the same as that of photomultiplier tube 55. The inner diameter of the load ring 204 is sized based on the forces that it must withstand. A self-wetting optical material is then poured into the inner annulus of the load ring 204, forming a slightly convex surface. The convex surface allows for good contact with the self-wetting coupler material prior to engaging the elastomeric load ring 204, thus providing a good optical interface.

The drawbacks associated with previous attempts to use a self-wetting clear material in an optical coupler are circumvented by the present invention which uses an elastomeric load ring 204. The elastomeric load ring 204 made from an elastomeric material can be bonded, or otherwise attached to the light detector device (e.g., photomultiplier tube 55) or to a window of a scintillation element 50 as an annular ring outside the primary light paths. The elastomeric load ring 204 serves as: (1) the primary load path to maintain the interface forces between the scintillation element 50 and the light detector device; and (2) as a retainer ring to prevent migration of the soft self-wetting clear material 202 from the interface. The result is an interface between the scintillation element 50 and light detector device that is self-healing, is pliable enough to maintain a clear bubble-free interface under extreme loads and vibration, and is more tolerant of fabrication and/or assembly tolerances.

Figure 10:
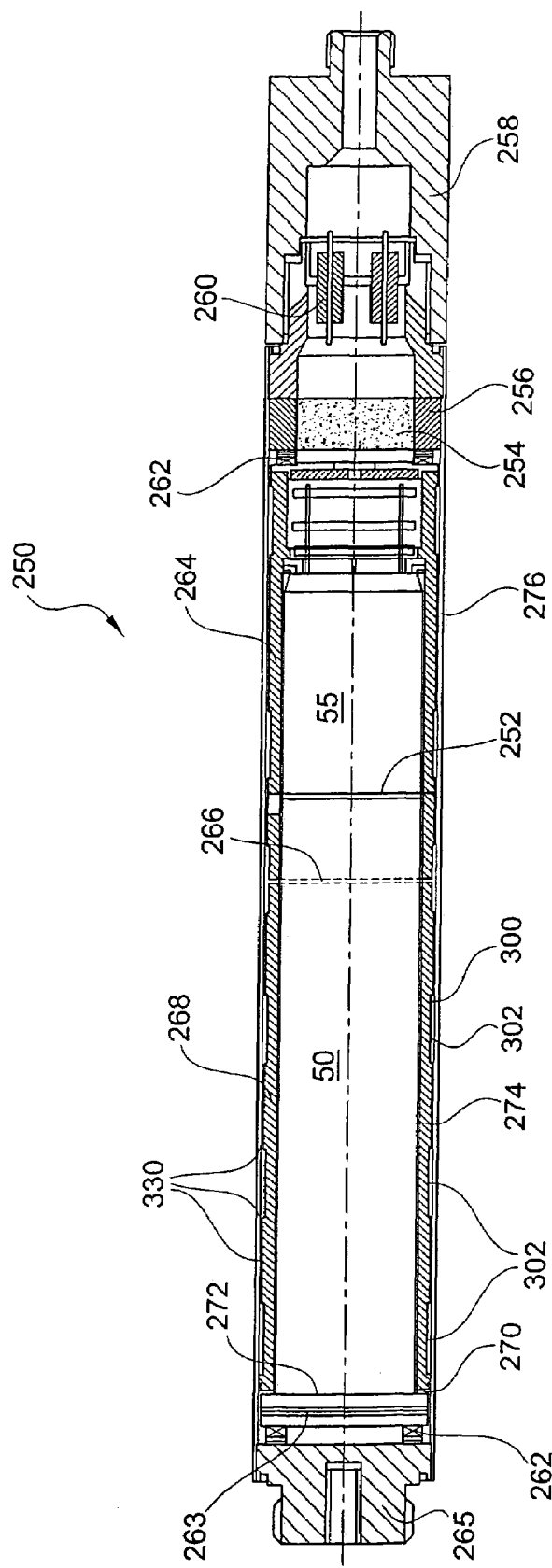
FIG. 10 is a cross-sectional view along the length of a gamma detector constructed in accordance with another embodiment of the invention.

Another preferred embodiment for a support mechanism will now be discussed with reference to FIGS. 10-15. With reference to FIG. 10, a gamma detector 250 having a support mechanism 300, which will be described in greater detail below. The gamma detector 250 has a scintillation element 50 (or "crystal") and a photo-multiplier tube 55 (or "PMT") separated by an optical coupler 252, which may be a compound optical coupler as described above. A photo-multiplier tube/scintillation element separation plane is represented by numeral 266. The gamma detector 250 has a wire insulator 254, wire clearance support 256, a hermetic feed through part 260 and an end fitting 258 to accommodate wires coming from the photo-multiplier tube 55.

The gamma detector 250 has a photo-multiplier tube housing 264 and a scintillation element housing 268. The photo-multiplier tube housing 264 is a solid housing, whereas the scintillation element housing 268 is a split housing. The split housing 268 helps restrain the scintillation element crystal at the photomultiplier tube interface, and functions to lock the PMT and crystal together. A reflective layer 274, which in a preferred embodiment may be a teflon reflective layer, is located interior of the housings 264, 268. As shown in FIG. 10, the gamma detector 250 has a reflector 272, and a longitudinal clearance 270 between the reflector 272 and housing 268. The gamma detector has longitudinal support springs 262 and an outer housings, as described and illustrated above with respect to gamma detector 250.

Figure 12:
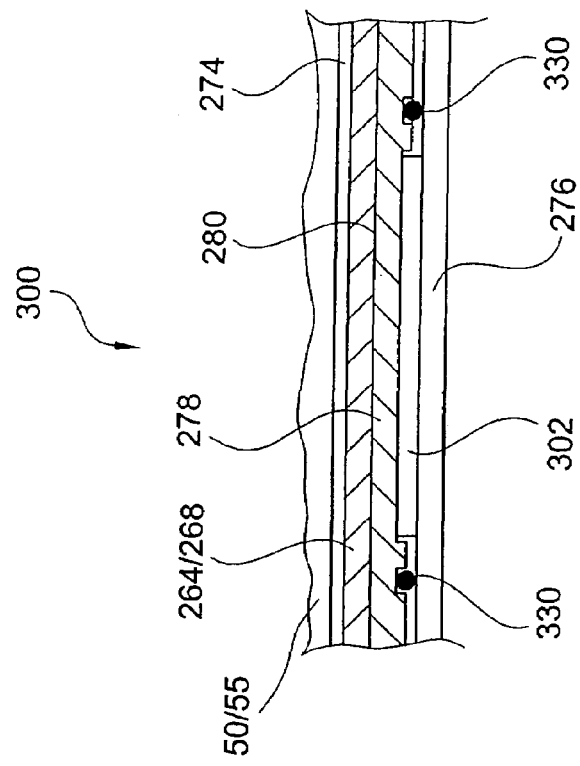
FIG. 12 is a close-up cross-sectional view of a portion of FIG. 10 in accordance with another embodiment of the invention.
Figure 11:
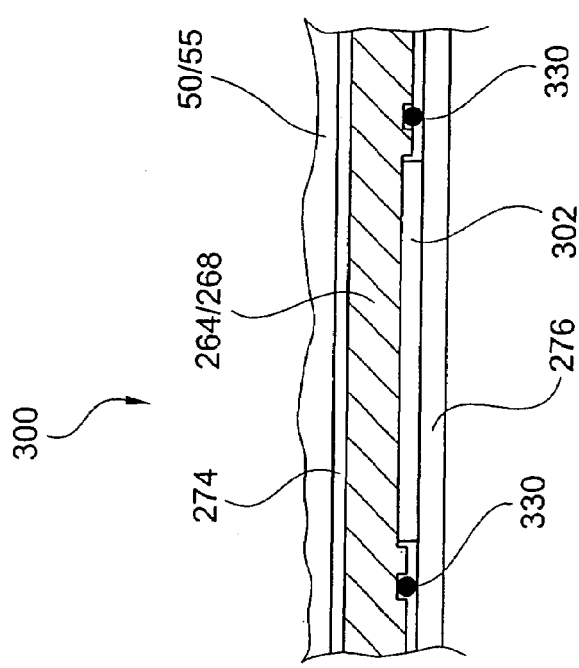
FIG. 11 is a close-up cross-sectional view of a portion of FIG. 10.

The support mechanism 300 is illustrated in greater detail in FIGS. 11 and 12. The support mechanism 300 comprises friction rings 302 and shock rings 330. In a preferred embodiment the shock rings 330 are elastomeric O-rings comprising viton rubber and having a durometer of 75. The friction rings 302 and O-rings 330 are disposed between the outer housing assembly 276 and scintillation element housing 268 or photo-multiplier tube housing 264. With reference to FIG. 12, another preferred embodiment of the support mechanism 300 has friction rings 302 and O-rings 330 disposed between the outer housing assembly 276 and an outer support housing 278. In the embodiment of FIG. 12, a lubricant 280 is disposed between the outer support housing 278 and housing 264, 268.

Figure 13:
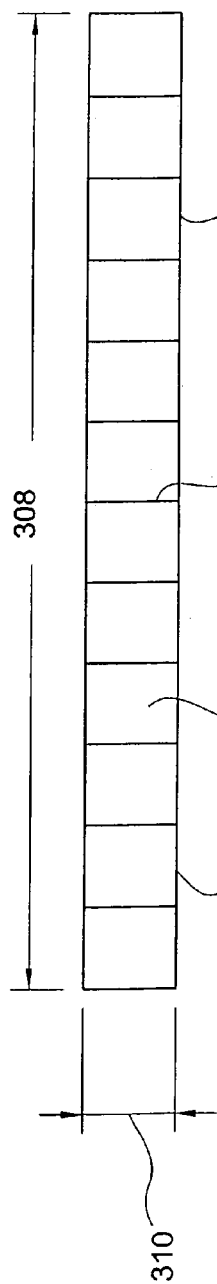
FIG. 13 is a top view of a corrugated sheet for a friction ring of the support mechanism of FIG. 10.
Figure 14:
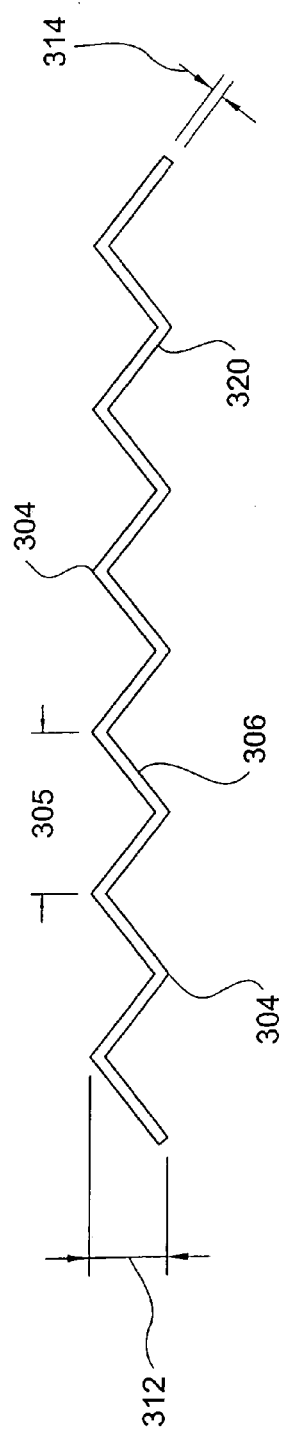
FIG. 14 is a side view of FIG. 10.
Figure 15:
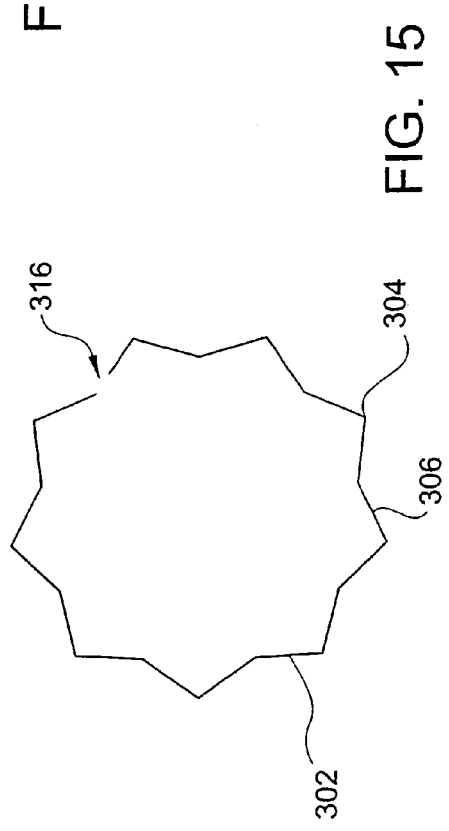
FIG. 15 is a view of an assembled friction ring of the support mechanism of FIG. 10.

The friction rings 302 are described in more detail with reference to FIGS. 13-15. The friction ring is made from a corrugated sheet 320. In a preferred embodiment, the friction ring comprises 17-7 PH Condition C stainless steel, heat treated to CH 900 after being formed into its final shape. The corrugated sheet of metal 320 has peaks 304 and flat portions 306. The corrugated sheet 320 has a length 308, a width 310, a height 312 and a thickness 314. In a preferred embodiment, the width 310 is between approximately 0.25 and 1.0 inches, and the height 312 is between approximately 0.010 and 0.10 inches. The length is chosen to accommodate the circumference of the scintillation element 50 and/or photo-multiplier tube 55. As shown in FIG. 15, the ends of the corrugated sheet 320 are brought together to form the friction ring 302, having a gap 316 between ends of the sheet 320.

The number of the friction rings 302 is chosen depending on the configuration of the gamma detector 250. In an exemplary embodiment, between four and seven friction rings are used. The friction rings 302 do not extend longitudinally along the gamma detector 250. Rather, the friction rings 302 extend around the circumference of the photo-multiplier tube 55 and/or scintillation element 50, and are spaced out in intervals along its length. The friction rings 302 may be disposed at different radial elevations with respect to the supported components 50 and 55, as discussed and illustrated above with respect to support rings 102. The friction rings 302 at different radial elevations do not have to be concentric and can be spaced apart along the length of the protected elements 50, 55.

In use, the gamma detector's inner assembly—the scintillation element/photo-multiplier tube and reflective layer 274—is supported by the friction rings 302 most of the time during operation. Typically, the friction rings 302 provide static support to the inner assembly for acceleration forces of up to 30 Gs, but not more than 50 Gs, where G is the acceleration due to gravity. The numerical value for the acceleration of gravity G is most accurately known as 9.8 m/s$^2$, with slight variations dependent primarily upon on altitude.

During most of the operation, the O-rings 330 do not provide support to the inner assembly. When the shock exerted on the gamma detector 250 exceeds the threshold of the static support of friction rings 302, the inner assembly will begin to move, or slide, relative to the surfaces of the friction rings 302. Such sliding friction is a very effective damping mechanism. During high shocks, in the range of 200 G to 1000 G, the friction rings 302 cannot prevent the inner assembly from moving to the point of impacting the housings 264, 268. During such high shocks, the O-rings 330 function as shock absorbers that limit movement of the inner assembly such that the inner assembly does not impact the housings 264, 268. In case the inner assembly does impact the housings 264, 268, the O-rings 330 function to ensure that the effect of the impact is not damaging.

During high shocks, each friction ring 302 does not allow movement of the inner assembly at the same instant, and friction forces between the friction rings and the inner assembly are reduced once movement, or sliding, begins. At this time, the O-rings 330 function to distribute the friction forces and to minimize movement of one portion of the inner assembly relative to other portions of the inner assembly. To accomplish this function, in a preferred embodiment the outside diameter (O.D.) of the installed O-rings 330 will typically be slightly smaller than the inside diameter (I.D.) of the housings 264, 268. A small amount of mechanical interference between the O-rings 330 and the housings 264, 268 will not impair the quality of the support mechanism 300. However, such mechanical interference may complicate installation of the components of the support mechanism 300, and may result in problems caused by differential thermal expansion of the components.

If the tolerances of the inner assembly and/or the rate of temperature change in parts of the inner assembly results in one portion of the inner assembly being more tightly held by the O-rings 330 than another portion, the photo-multiplier tube 55 may be pulled away from the scintillation element 50. Therefore, in a preferred embodiment, the O.D. of the installed O-rings 330 is slightly smaller than the I.D. of the housing 276. An exemplary difference between the O.D. of the O-rings 330 and the I.D. of the housing 276 is approximately 0.002 inches.

Dimensions should be controlled to prevent excessive compression of the O-rings 330 when the diameter of the inner assembly, including O-rings 330, is on the high side of its diametrical tolerance and/or the I.D. of the housing 276 is on the low side of its tolerance. In an exemplary embodiment, a suitable tolerance for an assembly for a scintillation crystal one inch in diameter is +/−0.004 inches, and a suitable tolerance for the I.D. of the housing 276 is +/−0.002 inches.

Friction rings 302 could be made from a thicker material, so that the friction forces between the friction rings 302 and the inner assembly would not be overcome even during high shocks up to 1000 Gs. O-rings 330 would not be needed in such a configuration. However, such a configuration for the support mechanism 250 would not be compliant when temperature cycles as high as 175° C., or even higher in some applications. The consequences would likely be excessive pressure on the entire assembly due to thermal expansion differential. Such differential expansion could damage the inner assembly, and, for example, cause the face of the photo-multiplier tube 55 to be pulled away from scintillation element 50.

A desired characteristic of the support mechanism 300 is that the use of friction rings 302 produces a support mechanism with a high resonant frequency. A support mechanism with high resonant frequency will not resonate with lower frequency vibrations that pass through the outer housing assembly 276. The support mechanism 300 provides a very rigid configuration under high vibration conditions. High vibration conditions, up to approximately 30 G, are typically experienced by mining equipment, whether for coal, potash, trona, oil or gas cutting and/or drilling operations. During the high vibration conditions, the friction rings 302 are essentially not movable, or "locked up" in the support mechanism 300, producing a rigid assembly having a high resonant frequency.

Because each peak 304 of the friction rings 302 is pressed against either the outer surface of the inner assembly or against the inner surface of the housings 264, 268, movement between the rings and the surfaces will be constrained by friction forces (unless high shocks overcome the friction forces). For vibration forces up to the designated release point at which the inner assembly begins to move with respect to the friction rings 302, which typically occurs between 30 G and 50 G, the peaks 304 will not slide relative to the surface of the inner assembly. Under such conditions, the portions of the flat portions 306 between the peaks 304 will be in either compression or tension, rather than bending.

Even though the friction rings 302 are formed from a thin material—typically 0.002 to 0.006 inches thick—when constrained in the manner described and illustrated, compression forces pass through corrugated side walls 307 of the friction ring 302 material between the peaks 304. Such a configuration provides high stiffness.

When the shock overcomes the frictional forces between the friction rings 302 and the inner assembly, however, the friction ring peaks 304 begin to slide relative to the surfaces of the inner assembly or the housings 264, 268. At such time the friction resistance will be reduced in magnitude, since sliding friction is less than static friction. As the inner assembly moves to one side of the gamma detector 250, the peaks 304 will be forced to spread, and the friction ring material will experience significant bending forces. The resonant frequency is reduced significantly during such sliding as the overall stiffness of the assembly is greatly reduced.

During such high shock events, when the resonant frequency drops significantly and the movement or displacement of the inner assembly becomes large, the sliding friction provides excellent damping. Once the sliding begins under high shock, the O-rings 330 absorb the energy produced by the relative motion of the inner assembly. The damping from the sliding friction prevents the build-up of low resonant frequency even though a significant part of the motion restraint is due to the O-rings 330, which have a relatively low stiffness that would allow low resonance frequency to build up if not adequately damped. In addition, as soon as the dynamic forces, which sustain relative motion between the inner assembly and the housings 264, 268, drop below the threshold value of the sliding friction, the inner assembly will once again be captured and restrained by the friction rings 302.

Design considerations for an exemplary embodiment of a detector having the support mechanism 300 will now be discussed. Successful design of a scintillation detector using the support mechanism 300 of the invention includes the O-Rings 330, friction rings 302, and housings 264, 268 with grooves to maintain proper alignment and spacing of the friction rings 302 and O-rings 330 during installation. In a preferred embodiment, housings 264, 268 comprise a PEEK liner. The PEEK liner is a hard surface for the friction rings 302 to press against and spread out the load. For large gamma detectors used for mining minerals such as coal, potash, or trona, the design parameters will typically be as described below. These parameters may be adjusted to satisfy application specific design parameters, or engineering and/or manufacturing preferences. For example, one adjustment that might be desired would be to increase the number of friction rings 302 for applications where the vibration levels might be above 25 Grms, in order to maintain friction support. GRMS is the root-mean-square acceleration (or rms acceleration), which is the square root of the mean square acceleration. Mean-square acceleration is the average of the square of the acceleration over time. Adding more friction rings 302 adds more steel around the scintillation element 50. Such would block radiation from reaching the scintillation element 50, so it would not normally be done unless needed for dynamic support under higher vibration levels. Changes should not normally be required for shock considerations since the typical practice would be to add an O-Ring 330 for each friction ring 302 added.

Operation effectiveness of a particular design for a support mechanism 300 can be easily verified by measuring the force on the end of the scintillation element 50 required to break static friction between the friction rings 302 and the inner assembly—when the inner assembly begins to slide relative to the friction rings 302. This force should be about 30% to 50% greater the force that is expected to result from worst case scenario vibration levels. Incidental shocks are generally not considered because the O-rings 330 will serve as shock absorbers after the static friction between the friction rings 302 and the inner assembly has been exceeded. This force is simply calculated as the product of the weight of the scintillation element 50 and the G levels being designed for. For example, if the worst case vibration level is expected to be 15 Gs, and the scintillation element 50 weights 0.5 pounds, the force required to push the scintillation element 50 should be approximately between 10 pounds and 12 pounds. This can be easily checked during prototyping by use of a simulator of the scintillation element 50, and can be checked during production as frequently as deemed useful for the assembly process being used. If a prototype is designed using the following exemplary guidelines and is found by testing to not have adequate friction resistance, additional friction rings 302 can be added. Fewer friction rings 302 can be used, but such should be done with caution if there is a chance of the detector receiving high shocks during handling or operational use.

Although the design guidelines are discussed with respect to a scintillation element, they are equally applicable to a complete radiation detector assembly which also may include accelerometers, rate gyros, power supplies, microprocessors and other elements. For a situation where a small scintillation element 50 is used together with a large electronics module, the number of friction rings 302 and O-rings 330 can be reduced for the end of the detector which supports the electronics module and/or the number of friction rings 302 used on the heavier end of the detector, having the scintillation element 50, may be increased. For special cases, good engineering judgment must be used. Fortunately, if testing of a new design indicates a problem, the number of friction rings 302 can easily be changed without a major re-start of the development process.

Use of friction rings 302 for support allows the design process to be greatly simplified over earlier support mechanisms, such as flexible dynamic housings and flexible sleeves. To illustrate the simplified and straightforward process, typical design parameters for the two major categories of scintillation element 50 sizes are discussed below. One typical size category is for scintillation element 50 crystals that are between 0.75 and 1.25 inches in diameter, and the other category is for scintillation element 50 crystals between 1.75 and 2.5 inches in diameter. The following parameters are suitable for complete gamma detectors that include scintillation elements 50, photomultiplier tubes 55, electronics and the like.

Important parameter selections for scintillation elements between 1.75 and 2.5 inches in diameter include the dimensions of the friction rings 302, the number of friction rings 302, dimensions of the O-rings 330, the number of O-rings 330, radial spacing between elements, and the pitch 305, which is the distance between adjacent peaks of the sheet 320 from which friction rings 302 are made. The PEEK liner 264, 268 between the scintillation element 50 and the inside diameter of the outer housing 276 would typically have a wall thickness of approximately 0.070 inches, and the diameter would be selected to leave a gap of approximately 0.030 inches between the PEEK liner and the shield.

Figure 16:
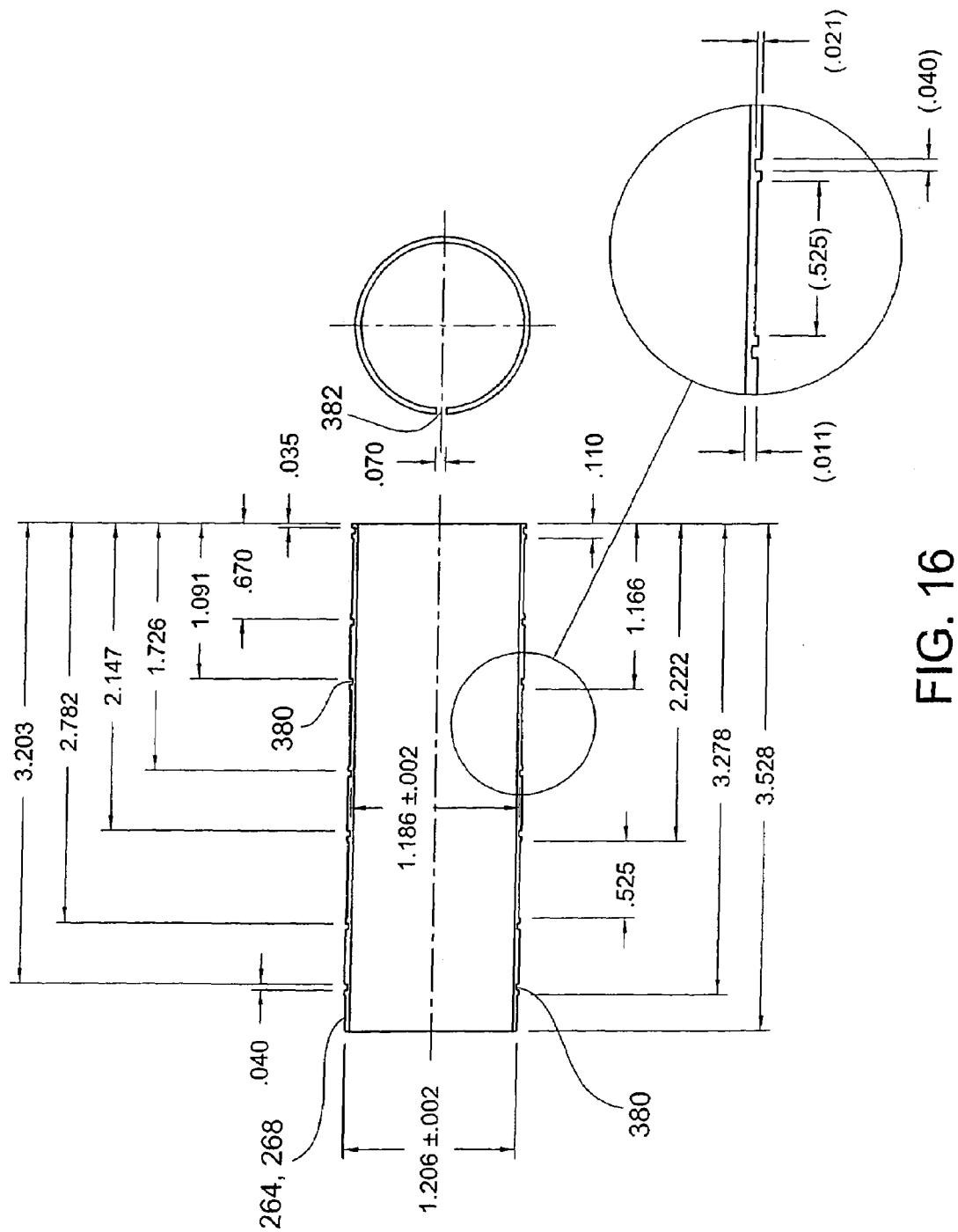
FIG. 16 is an illustration of a liner in accordance with a preferred embodiment of the invention.

Grooves 380 should be cut into, or otherwise formed in the PEEK liner to retain the friction rings 302 (FIG. 16). Making such grooves 0.035 inches deep, and making the friction ring waves 306 to have a height 312 of 0.080 inches would, in use, compress the friction rings 302 by 0.015 inches. Similarly, use of standard O-rings 330 that are 0.070 inches in diameter, and making O-ring grooves 0.045 inches deep would leave the O-rings 330 with no compression, so that the O-rings 330 would not be restraining the scintillation element 50. Rather, the O-rings 330 would function to cushion the scintillation element 50 when shock forces exceed the friction forces. It is acceptable to choose dimensions so that there is a nominal, small gap between the O-rings 330 and the inside diameter of the shield. Ideally, there will be less than 0.010 inches of compression on the O-rings 330 at high temperatures, including tolerances, and the gap at cold temperatures, including tolerances, would be less than 0.010 inches. In a preferred embodiment, O-rings 330 are viton O-rings having a hardness durometer of 75. The O-ring grooves 380 in the PEEK liner 264, 268 restrain movement of the O-rings in a linear direction.

In a preferred embodiment, a typical arrangement of friction rings 302 and O-rings 330 would be to place friction rings 302, having a width of 0.5 inches, at approximately 1.5 inches from each other along the length of a scintillation element 50. One O-ring 330 would be place between each pair of friction rings 302. With this arrangement, the number of O-rings 330 will be one less than the number of friction rings 302. The number of friction rings 302 and O-Rings 330 is dependent on the length of scintillation detector.

Important parameters, typical for smaller scintillation elements 50 having diameters between 0.75 and 1.25 inches, are described below. Since the mass of scintillation elements 50 in this size range is smaller than for larger scintillation elements described above, the characteristics of the support mechanism 300 can be changed to allow more room for needed detector elements. Many gamma detectors used for wireline applications, such as logging coal or potash formations, and most Measurement While Drilling or Logging While Drilling applications for oil and gas drilling operations, utilize smaller scintillation elements 50, since the gamma detectors must fit within the drilling or logging tools. Logging of mineral formations could, in rare instances, incorporate larger scintillation element crystals, and in such circumstances the design parameters discussed above would be applicable. Parameter values may be adjusted as needed according to good engineering judgment. However, once the information in this specification is understood, complex analysis should not be required to select these parameter values.

With reference to FIG. 16, the PEEK liner, having 0.040 inch thick walls, with a longitudinal slit approximately 0.090 inches wide along the entire length of the PEEK liner is provided. The outer diameter of the PEEK liner is 0.034 inches smaller than the inner diameter of the outer housing assembly 276. Circumferential grooves 380 in the PEEK liner, which is formed into a tube, are included to retain in place the friction rings 302 and O-rings 330 during and after assembly. Grooves 0.525 inches wide by 0.020 inches deep are incorporated into the PEEK liner to accommodate friction rings that are 0.5 inches wide. Similarly, grooves 0.040 inches wide by 0.015 inches deep in the PEEK liner accommodate O-rings having a cross-section diameter of 0.032 inches.

Design parameters for friction rings 302 in a preferred embodiment are as follows. In a preferred embodiment, friction rings 302 have a width of 0.5 inches, a height of 0.035 inches, and pitch of 0.25 inches. In a preferred embodiment, circular O-rings 330 are made from Viton rubber, having a cross-sectional diameter of 0.032 inches. The O-rings 330 have an outer diameter that is 0.024 inches greater than the outer diameter of the PEEK liner tube. Such a configuration provides a gap between the outer diameter of the O-Ring and the sleeve. Thus, as discussed above, the O-rings 330 do not function to restrain the inner assembly under normal low shock operations.

An installation liner 428 (shown in FIG. 17), which in a preferred embodiment is made from 0.002 inch thick stainless steel wrap, is installed around the outside of the friction rings 302 and O-rings 330 to facilitate installation of the support mechanism 300 into the sleeve. The installation liner 428 covers the assembly so that when it is installed into the outer housing assembly 276, the friction rings 302 and O-rings 330 do not become caught on any rough surfaces and displaced.

Manufacturing considerations for a support mechanism 300 according to a preferred embodiment are now discussed. The PEEK liner is fabricated by machining a section of PEEK tube, or solid PEEK material, to the dimensions described above in the design considerations section. The fabrication of the PEEK liner includes cutting of a 0.090 inch wide longitudinal slit 382 along the PEEK liner, which is formed into a tube. PEEK is known to be suitable for use as a liner around a sodium iodide crystal since it has a thermal coefficient of expansion of approximately equal to that of the crystal. The PEEK material, after being baked at 200 degrees C., will not off-gas or lose its mechanical properties as do many plastic materials.

Manufacture of friction rings typically starts with cutting 0.5 inch wide strips from a 17.7 Ph stainless steel that is 0.002-0.006 inches thick. Such stainless steel is a condition C material. Length of such strips is optional. It is desirable, however, that the sheets 320 be long enough to fabricate several friction rings 302 from one strip. Each of the 0.5-inch-wide strips is run between wave shaping wheels on a Beading Machine to create the wave shapes 306 of the friction ring 302. An example of such a Beading Machine is Model 0581 from the Roper Whitney Company. After shaping the waves 306 into the 0.5 inch wide strips, the strips are cut into sheets 320 having a length 308 equal to the circumferential length of the individual friction ring 302. In a preferred embodiment, the length 308 is equal to $L=0.95 \cdot \pi \cdot D$. For example, the length 308 for a sheet 320 for use with a 1 inch diameter scintillation element crystal would be 2.98 inches. After the friction rings 302 are cut to a proper length 308, the friction rings 302 should undergo heat-treatment to raise the material strength to condition CH900.

Assembly considerations for a support mechanism 300 according to a preferred embodiment are now discussed. Initially, all mechanical parts are cleaned and gathered to prepare for assembly. The window unit is bonded to the two part optical coupler, as discussed above, and thereafter the window unit is welded to the housing. At this stage, all moisture is baked out from all of the parts. Next, the scintillation element crystal is compensated, and the scintillation element crystal interface is polished. Compensation is a preparation procedure for the outer surface of the crystal so that it will reflect light for optimum performance.

The scintillation element crystal is next wrapped with, in a preferred embodiment, three layers of compressed Teflon tape, and the Teflon tape is covered with reflective layer 274. Next the PEEK liner is installed over the scintillation element crystal package. The support mechanism 300 is further assembled by installing O-rings 330 in grooves of the PEEK liner, and friction rings 302 are installed into grooves of the PEEK liner. In a preferred embodiment, a tape such as kapton tape is used to secure the friction rings into the grooves of the PEEK liner.

Next, the PEEK liner 264, 268 is wrapped with a 0.002 assembly installation tool, and the assembly is installed into the outer housing 276. A reflector 272 is then placed onto a rear surface of the scintillation element crystal 50, and compression plates and shims 263 are added to the rear surface of the scintillation element crystal. Thereafter, longitudinal support springs 262, which in a preferred embodiment comprise wave springs, are installed the rear of scintillation crystal package with enough linear force to override the friction force of the friction rings by approximately 25%. The end cap is then installed and welded into place.

Assembly considerations for another support mechanism 300 according to a preferred embodiment are now discussed. All mechanical parts are cleaned and prepared for assembly, which is started by welding an end cap onto the housing. The photomultiplier tube 55 is packaged into the housing 264, and the two-part optical coupler is bonded onto the photomultiplier tube 55, as discussed above. There after, a hermetic feed-thru 260 is installed onto the photomultiplier tube 55. At this stage, all moisture is baked out from all of the parts.

The scintillation element crystal is then prepared for assembly as discussed above. Namely, the scintillation element crystal is compensated, and the scintillation element crystal interface is polished. The scintillation element crystal is next wrapped with, in a preferred embodiment, three layers of compressed Teflon tape, and the Teflon tape is covered with reflective layer 274. Next the PEEK liner is installed over the scintillation element crystal package. The support mechanism 300 is further assembled by installing O-rings 330 in grooves of the PEEK liner, and friction rings 302 are installed into grooves of the PEEK liner. In a preferred embodiment, a tape such as kapton tape is used to secure the friction rings into the grooves of the PEEK liner.

The assembly process continues by inserting the scintillation element crystal package into photomultiplier tube package, with the polished end of crystal resting against the optical coupler. The photomultiplier tube and scintillation element crystal are then placed into an assembly fixture. A reflector is placed onto the rear of the scintillation element crystal, and compression plates and shims are added on the rear of scintillation crystal package. Thereafter, wave springs 262 are installed on rear of the scintillation element crystal package, with enough linear force to override the friction force of the friction rings 25%, approximately.

The assembly is completed by wrapping the scintillation element crystal package and the photomultiplier tube package with a 0.002 installation tool, as discussed above. The housing is then installed over scintillation element crystal package and photomultiplier tube package, so that the housing is completely seated onto the hermetic feed thru 260. The feed thru 260 is welded to the housing, and the unit is thermal cycled prior to performing any tests. Then, wires are installed onto the feed thru 260. Finally, appropriate detector ends 265 are installed onto the detector, and performance and environmental testing can begin.

An embodiment of the PEEK liner 264, 268 is shown in FIG. 16. The PEEK liner 264, 268 has grooves 380 into which friction rings 302 and O-rings 330 are installed, as discussed above. The PEEK liner 264, 268 also has a longitudinal slit 382, as shown. The dimensions shown in FIG. 16 are in inches, and are only an example of a configuration according to a preferred embodiment of the PEEK liner 264, 268.

Figure 17:
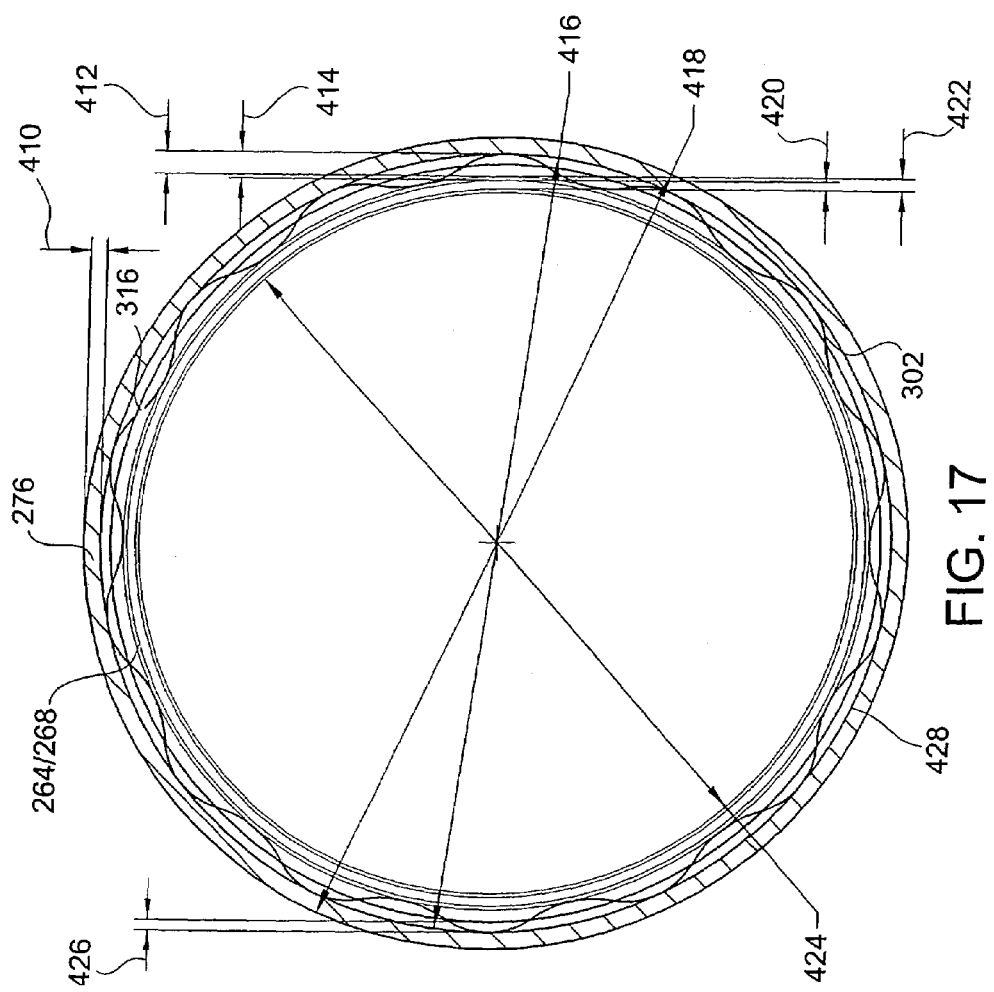
FIG. 17 is a cross-sectional view of the gamma detector having a support mechanism in accordance with an embodiment of the present invention.
Figure 19:
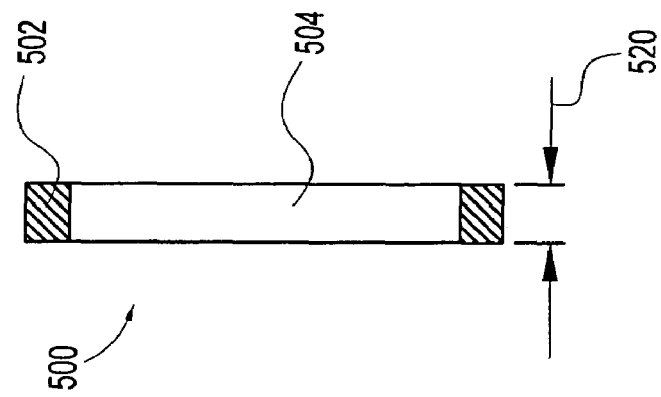
FIG. 19 is a cross-sectional view of an the compound optical coupler assembly of FIG. 18.
Figure 18:
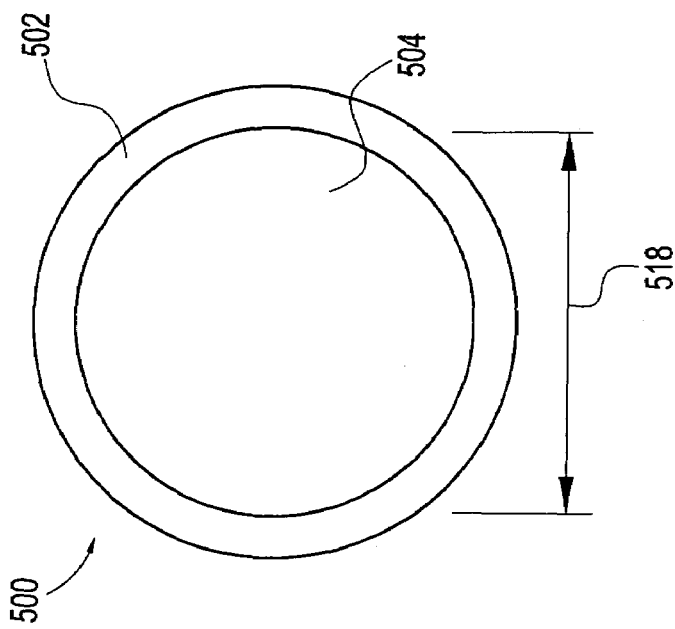
FIG. 18 is an illustration of a compound optical coupler assembly in accordance with another embodiment of the invention.
Figures 20, 21:
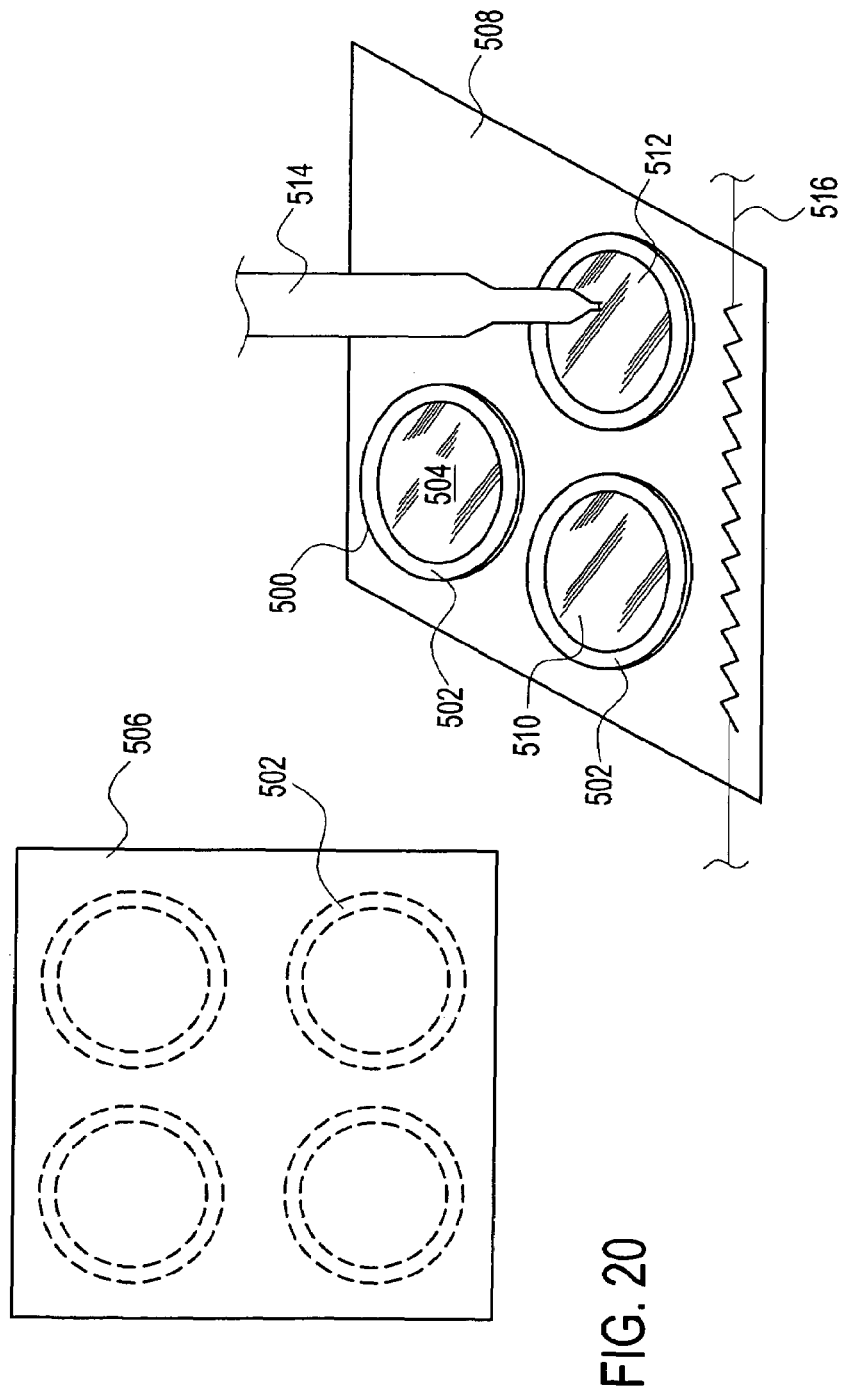
FIGS. 20 and 21 illustrate fabrication of the compound optical coupler assembly of FIG. 18.

Refer now to FIG. 17, which shows a cross-sectional view of an assembled detector having a support mechanism 300 in accordance with an embodiment of the present invention. FIG. 17 shows the outer housing 276 having a thickness 410, and having a clearance 412 between it and the PEEK liner 264, 268. The outer housing 276 has a clearance 414 between it and the O-ring 330 (not shown in FIG. 17). The outer housing 276 has an inside diameter 416 and an outside diameter 418. FIG. 17 also shows the PEEK liner thickness at the O-ring 330 represented by numeral 420, and at friction ring 302, represented by numeral 422. The scintillation element crystal has a diameter 424. Clearance between the PEEK liner and the inside diameter of the outer housing 276 is represented by numeral 426.

In a preferred embodiment, the housing thickness 410 is 0.045 inches, and the inside diameter 416 is 2.223 inches and the outside diameter 418 is 2.313 inches to accommodate a scintillation element crystal having a diameter 424 of 2 inches. The PEEK liner thickness 420 (at O-ring) is 0.025 inches, and the PEEK liner thickness (at friction ring) 422 is 0.035 inches. The available clearance 412 between the friction rings 302 and the outer housing 276 is 0.065 inches. The available clearance 414 between the O-rings 330 and the outer housing 276 is 0.075 inches. The clearance 426 between the PEEK liner 264, 268 and the inside diameter of the outer housing 276 is 0.030 inches. In the embodiment of FIG. 17, the friction ring 302 has a height of 0.080 inches at 0.50 pitch, and the O-ring 330 has a diametrical cross-section of 0.070 inches, and a clearance of 0.005 inches to the internal diameter of the outer housing 276.

A compound optical coupler assembly in accordance with another embodiment of the invention will now be described with reference to FIGS. 18-21. The compound optical coupler assembly 500 of this embodiment has a load ring 502 and a compound optical pad 504. The compound optical coupler assembly 500 is discussed in greater detail below.

The compound optical coupler assembly 51, 53 disclosed above overcame shortcomings in the prior art, as discussed for example in the Background portion of this specification. For example, the compound optical coupler assembly 51, 53 and its load ring portion 204 assured proper loading upon the photo-multiplier tube 55 by the scintillation element 50. The loads experienced in use can be carried by the load ring 204 portion of the assembly, while allowing the inner light-transmitting portion of the coupler assembly 51, 53 to be made from a softer, self wetting optical coupling gel 202, such as Wacker, which cannot carry loads. Loads on the optical coupler assembly derive from spring forces that hold the photo-multiplier tube 55 and the scintillation element 50 together, dynamic loads due to shock and vibration, as well as thermally induced loading.

To install the compound optical coupler assembly 51, 53, the load ring 204 is typically attached to the photo-multiplier tube housing or to the photo-multiplier tube faceplate. This procedure requires special care during installation and consumes a considerable amount of time. An issue discovered by the applicants is that disassembly of the photo-multiplier tube 55 from its housing, or disassembly of other detector components, may be required for various reasons during assembly of the detector. One such reason for disassembly is to adjust the friction loading on the elements. The disassembly and reassembly processes require attention and time from highly skilled and trained workers, and significantly increases the cost of fabrication of the detector.

During disassembly, the inventors have found that the compound optical coupler assembly 51, 53 may be difficult to remove while maintaining the shape of the light-transmitting self-wetting optical coupling gel 202 portion of the coupler assembly 51, 53. This is due, for example, to the sticky or tacky nature of the soft self-wetting optical coupling gel 202, and its inability to retain the shape it acquired after initial installation. Whenever the photo-multiplier tube 55 and the scintillation element 50 are separated, the self-wetting gel may be pulled apart with some amount remaining on the surface of the faceplate of the photo-multiplier tube 55 and some amount remaining on the surface of the scintillation element 50.

To overcome this problem, while maintaining the desirable characteristics of the compound optical coupler assembly 51, 53 disclosed above, the inventors have developed an improvement, which is discussed below. The improvement will allow the compound optical coupler assembly 500 to be quickly and efficiently installed, and reinstalled if removal is required, during the manufacturing and assembly process.

An important feature of the compound optical coupler assembly 500 is a light-transmitting compound optical pad 504 that has the desirable characteristics of the light-transmitting self-wetting optical coupling gel 202 that can be easily and quickly installed and can be easily removed and/or replaced. The assembly 500 also has a load ring 502 to carry the mechanical loads between the photo-multiplier tube 55 and the scintillation element 50, and to provide peripheral support to the light-transmitting compound optical pad 504. It is desirable that the compound optical coupler assembly 500 be handled as a single component. A challenge in making a compound coupler assembly has been that the self-wetting optical coupling gel has such sticky or tacky properties that it is difficult to construct the optical coupler without it adhering to other adjacent equipment and surfaces used to produce the optical coupler assembly.

To overcome this problem, the inventors have developed a compound optical coupler assembly 500 having a load ring 502 and a novel compound optical pad 504. The compound optical pad 504 has a self-wetting optical coupling gel and also an amount of a stiffening agent. In one embodiment it has been discovered that adding a small amount of Sylgard to the self-wetting optical gel, Wacker for example, sufficiently reduces the sticky and tacky properties of the Wacker while preserving sufficient self-wetting properties and allows the compound optical pad 504 to adhere to the load ring 502. Addition of the stiffening agent such as Sylgard results in a sufficient reduction of the Wacker such that the resulting compound optical pad 504 exhibits stability during construction and installation. The desirable self-wetting properties and optical characteristics of Wacker, such as elimination of reflective characteristics and air gaps from the optical coupler interface, are maintained.

In one embodiment, it has been determined that a mixture of one part of the stiffening agent, e.g., Sylgard, with five parts the self-wetting optical coupler gel, e.g., Wacker, results in a suitable compound optical pad 504. In a preferred embodiment the Sylgard is Sylgard(186) and the Wacker is Wacker(512). Other variations of Sylgard and/or Wacker, and like materials, may be used. The inventors have found also that other mixtures ranging from about 1:25 to about 1:1 ratios of the stiffening agent to the self-wetting optical gel can be used to form the compound optical pad 504, depending upon particular applications.

As a result, the compound optical coupler assembly 500 can be manufactured apart from other detector components, and then simply inserted between the photo-multiplier tube 55 and the scintillation element 50 during the appropriate step in the assembly process. The compound optical coupler assembly 500, including the load ring 502 and the compound optical pad 504, can be installed as one unit. Alternatively, the compound coupler pad 504 can be fabricated as an individual component, which can then be installed during the assembly process of the detector by simply placing the compound optical pad 504 inside the previously installed load ring 502. The load ring 502 is needed to keep the compound optical pad 504 in place, and to prevent migration of the Wacker outside the compound optical coupler assembly 500, and deterioration of the assembly 500. The load ring 502 can be installed into a preformed opening or recess, and there is no need to glue or mold the load ring 502 to a corresponding surface of the detector.

An exemplary technique for making the compound optical coupler assembly 500 according to an embodiment of the invention will now be described. The process can initiated by forming a sheet 506 of Sylgard(186), from which load rings 502 will be cut. The load rings 502 are thereafter cut from the sheet 506.

The load ring 502 is then placed onto a surface such as a cleaned glass surface 508. Thereafter a controlled amount of a predetermined mixture 512 of a stiffening agent and a self-wetting optical coupler gel (e.g., Sylgard and Wacker, as discussed above) is injected or otherwise delivered into the center 510 of the load ring 502. The mixture 512 can be injected using a micro-dispenser 514, such as a syringe, for example.

The mixture 512 is then allowed to cure. The mixture may be allowed to cure at room temperature, which may take several hours. Alternatively, a heat source 516 may be used to heat the mixture 512 to speed up the curing process to a matter of minutes. When the mixture 512 cures it becomes the compound optical pad 504. The compound optical pad 504 sticks or attaches to the load ring 502, and the compound optical pad 504 together with the load ring 502 become the compound optical coupler assembly 500. The compound optical coupler assembly 500 can at this stage be removed from the glass surface 508 and installed into the detector.

When determining the ratio of the Sylgard to Wacker that should comprise the mixture 512, and eventually the compound optical pad 504, several criteria should be considered. A minimum amount of Sylgard should be used to preserve the maximum amount of the Wacker and its self-wetting properties. However, a sufficient amount of Sylgard should be used to allow the compound optical coupler assembly 500 to be removed from the glass surface 508, and installed and removed, if needed, during assembly while generally retaining its shape. In use, the self-wetting properties retained by the compound optical pad 504 allow it to re-apply itself to an adjacent surface, such as a window or the photo-multiplier tube 55, if moved or dislodged due to an extreme shock impulse and/or vibration when the detector is in use.

It has been found by the inventors that as the load ring's 502 inner diameter 518 increases, relatively more Sylgard may be needed in the mixture 512. Otherwise, the resulting compound optical pad 504 may not be able to tolerate as much sticky and tacky properties of the Wacker on the surface facing the detector window, photo-multiplier tube 55, etc., and it may be difficult to remove the compound optical coupler assembly 500 without damaging the compound optical pad 504.

It has also been found by the inventors that as the thickness 520 of the load ring 502 increases, relatively less Sylgard may be used in the mixture 512. This is because there will be more surface area for adhesion between the Wacker and the inside diameter surface of the load ring 502 because of the increased thickness 520 of the load ring 502.

While the invention has been described in detail in connection with preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

What is claimed as new and desired to be protected by Letters Patent of the United States is:

1. A compound optical coupler assembly for use in a gamma detector, comprising:
    a load ring having an opening therein; and
    a compound optical pad inside said opening, wherein said compound optical pad comprises a self-wetting optical gel and a stiffening agent.

2. The compound optical coupler assembly of claim 1, wherein said compound optical pad comprises one part of the stiffening agent to five parts of the self-wetting optical gel.

3. The compound optical coupler assembly of claim 1, wherein said compound optical pad comprises one part of the stiffening agent to twenty five parts of the self-wetting optical gel.

4. The compound optical coupler assembly of claim 1, wherein said compound optical pad comprises one part of the stiffening agent to one part of the self-wetting optical gel.

5. A method for forming a compound optical coupler assembly, comprising:
    forming a load ring having an opening therein;
    placing a load ring onto a processing surface;

delivering a mixture into said opening of said load ring, said mixture comprising a self-wetting coupler gel and a stiffening agent; and allowing said mixture to cure inside said opening of said load ring.

6. The method of claim 5, further comprising:

forming a sheet of said stiffening agent prior to said forming said load ring, and cutting said load ring from said sheet.

7. The method of claim 5, wherein said placing said load ring onto said processing surface comprises placing said load ring onto a glass surface.

8. The method of claim 5, wherein said delivering said mixture comprises delivering said mixture via a micro-dispenser.

9. The method of claim 5, wherein said allowing said mixture to cure comprises adding heat.

* * * * *